Nov. 24, 1959   L. P. RETZINGER, JR   2,914,758
DIGITAL-TO-ANALOG CONVERTER
Filed Nov. 5, 1954   7 Sheets-Sheet 3

INVENTOR
LEO P. RETZINGER, JR.

BY Theodore H. Lassagne
ATTORNEY

| PULSE POSITION | FLIP-FLOP 66 | FLIP-FLOP 68 | FLIP-FLOP 70 | FLIP-FLOP 72 | FLIP-FLOP 74 |
|---|---|---|---|---|---|
| 1 | L | L | L | L | L |
| 2 | R | L | L | L | L |
| 3 | L | R | L | L | L |
| 4 | R | R | L | L | L |
| 5 | L | L | R | L | L |
| 6 | R | L | R | L | L |
| 7 | L | R | R | L | L |
| 8 | R | R | R | L | L |
| 9 | L | L | L | R | L |
| 10 | R | L | L | R | L |
| 11 | L | R | L | R | L |
| 12 | R | R | L | R | L |
| 13 | L | L | R | R | L |
| 14 | R | L | R | R | L |
| 15 | L | R | R | R | L |
| 16 | R | R | R | R | L |
| 17 | L | L | L | L | R |
| 18 | R | L | L | L | R |

INVENTOR
LEO P. RETZINGER, JR.

BY Theodore H. Lassagne

ATTORNEY

Nov. 24, 1959  L. P. RETZINGER, JR  2,914,758
DIGITAL-TO-ANALOG CONVERTER
Filed Nov. 5, 1954  7 Sheets-Sheet 6

| BINARY DIGITAL ERROR, E - POSITION | DECIMAL VALUE | ERROR REGISTER CODING $E_4 E_3 E_2 E_1$ |
|---|---|---|
| 18       10 9 8 7 6 5 4 3 2 1 | | |
| 0----------0 1 1 1 1 1 1 1 1 1 | +511 | 0 1 1 1 |
| 0----------0 1 1 1 1 1 1 1 1 0 | +510 | 0 1 1 1 |
| . | . | . |
| 0--------0 0 1 1 0 1 0 0 0 0 | +208 | 0 1 1 1 |
| . | . | . |
| 0--------0 0 0 0 0 0 1 0 1 1 | | . |
| 0--------0 0 0 0 0 0 1 0 1 1 | +10 | 0 1 1 1 |
| 0--------0 0 0 0 0 0 1 0 1 1 | +9 | 0 1 1 1 |
| 0--------0 0 0 0 0 0 1 0 0 0 | +8 | 0 1 1 1 |
| 0--------0 0 0 0 0 0 0 1 1 1 | +7 | 0 1 1 1 |
| 0--------0 0 0 0 0 0 0 1 1 1 | +6 | 0 1 1 1 |
| 0--------0 0 0 0 0 0 0 1 0 1 | +5 | 0 1 0 1 |
| 0--------0 0 0 0 0 0 0 1 0 0 | +4 | 0 1 0 1 |
| 0--------0 0 0 0 0 0 0 0 1 1 | +3 | 0 1 1 1 |
| 0--------0 0 0 0 0 0 0 0 1 0 | +2 | 0 0 1 1 |
| 0--------0 0 0 0 0 0 0 0 0 1 | +1 | 0 0 0 1 |
| 0--------0 0 0 0 0 0 0 0 0 0 | 0 | 0 0 0 0 |
| 1--------1 1 1 1 1 1 1 1 1 1 | -1 | 1 1 1 1 |
| 1--------1 1 1 1 1 1 1 1 1 0 | -2 | 1 1 1 0 |
| 1--------1 1 1 1 1 1 1 1 0 1 | -3 | 1 1 0 1 |
| 1--------1 1 1 1 1 1 1 1 0 0 | -4 | 1 1 0 0 |
| 1--------1 1 1 1 1 1 1 0 1 1 | -5 | 1 0 1 1 |
| 1--------1 1 1 1 1 1 1 0 1 0 | -6 | 1 0 1 0 |
| 1--------1 1 1 1 1 1 1 0 0 1 | -7 | 1 0 0 1 |
| 1--------1 1 1 1 1 1 1 0 0 0 | -8 | 1 0 0 0 |
| 1--------1 1 1 1 1 0 1 1 1 | -9 | 1 0 0 0 |
| 1--------1 1 1 1 1 0 1 1 0 | -10 | 1 0 0 0 |
| 1--------1 1 1 1 1 0 1 0 1 | -11 | 1 0 0 0 |
| . | . | . |
| 1--------1 0 1 0 1 0 0 0 0 0 | -352 | 1 0 0 0 |
| . | . | . |
| 1---------1 0 0 0 0 0 0 0 1 0 | -510 | 1 0 0 0 |
| 1---------1 0 0 0 0 0 0 0 0 1 | -511 | 1 0 0 0 |
| 1---------1 0 0 0 0 0 0 0 0 0 | -512 | 1 0 0 0 |

PROPORTIONAL REGION (covers rows from +8 down to -8)

$P_{17} P_{16} P_{15} P_{14} P_{13} P_{12} P_{11} P_{10} P_9 P_8 P_7 P_6 P_5 P_4 P_3 P_2 P_1 P_0$ ◄—TIME

FIG. 7.

INVENTOR
LEO P. RETZINGER, JR.

BY Theodore H. Lassagne
ATTORNEY

Nov. 24, 1959 L. P. RETZINGER, JR 2,914,758
DIGITAL-TO-ANALOG CONVERTER
Filed Nov. 5, 1954 7 Sheets-Sheet 7

INVENTOR
LEO P. RETZINGER, JR.

BY Theodore H. Lassagne
ATTORNEY

United States Patent Office

2,914,758
Patented Nov. 24, 1959

2,914,758

DIGITAL-TO-ANALOG CONVERTER

Leo P. Retzinger, Jr., Reseda, Calif., assignor to Librascope, Incorporated, Glendale, Calif., a corporation of California Application November 5, 1954, Serial No. 467,155

28 Claims. (Cl. 340—347)

This invention relates to digital-to-analogue converters and more particularly to apparatus for converting a plurality of electrical signals representing a value in digital form into an electrical voltage having an amplitude corresponding to the value. The invention is especially adapted to be used in converting an error signal in digital form into a corresponding electrical signal for use in driving a servo in a direction to minimize the error signal.

In many types of equipment, one member must accurately follow the movements of another member. For example, in anti-aircraft guns, a radar set or other electronic equipment is used to track a target such as an airplane and a gun is coupled to the radar set to effect related movements of the set and gun. Servos are employed as the coupling between the radar set and the gun to detect any differences in movement between the radar set and the gun. These differences in movement are converted by the servos into proportionate electrical voltages. As is well known, electrical voltages are analogue quantities.

In order for the gun to have an optimum accuracy, equipment is included with the radar set to perform computations which provide corrections for such factors as wind velocity and the movement of the plane. These computations are preferably performed on a digital basis to provide an enhanced accuracy in the results obtained. In digital computations, a plurality of signals are produced to represent the values of successive digits in a multi-digital number. The results obtained from the digital computations control the tracking movements of the radar set and the aiming of the gun.

Since the positioning of the radar set at any instant is controlled by digital computations and since the positioning of the gun at any instant is controlled by an analogue error voltage, converters must be provided to change the analogue voltage to corresponding digital signals and to change the digital signals to corresponding analogue voltages. Many attempts have been made in recent years to provide such converters, but the attempts have not been entirely successful. The attempts have not been entirely successful for several reasons. For example, the converters have been slow and cumbersome and they have not always produced results with optimum accuracies.

This invention provides a digital-to-analogue converter for overcoming the above disadvantages. The converter operates to change digital signals representing values within particular limits to proportionate voltages. When the values represented by the digital signals are out of the particular limits, the converter operates to change the digital signals into voltages representing the particular limits. This is especially desirable when the values represent errors, since errors greater than a particular magnitude cannot be corrected any faster than errors representing the particular magnitude. This results from the operating limitations of the motor or other equipment producing the correction.

The conversion of the digital signals into a representative voltage is accomplished by a plurality of bistable members arranged in a balanced weighting network with a plurality of impedances. The impedances have particular values to limit the contribution of each bistable member to the output voltage in accordance with the numerical weight of the digit represented by the bistable member. By using a balanced weighting network, an output voltage having an enhanced accuracy is obtained.

The output voltage from the balanced weighting network is introduced to a balanced storage circuit including a pair of bridges and a pair of capacitances connected across the bridges. Each bridge is in turn formed from a plurality of diodes. The diodes in the bridges are so connected together that they pass current to the capacitances upon the production of the error voltage in the weighting network to produce a proportionate voltage difference across the capacitances. The diodes are also connected together to prevent the capacitances from discharging through the bridges during the time that a voltage is not produced by the weighting network. In this way, the full voltage across the capacitance is available for utilization to drive an output member, such as a gun, into a position to minimize the error signal.

An object of this invention is to provide a conversion of a digital quantity as represented by a plurality of signal indications into an analogue quantity as represented by an electrical voltage.

Another object is to provide a fast and accurate conversion of a digital quantity into a corresponding analogue quantity and the retention over a period of time of the analogue quantity in its accurate form for subsequent use.

A further object is to provide a conversion of a digital quantity into an analogue quantity in a form especially adapted for use as an error signal in adjusting the positioning of a member such as an output shaft.

Still another object is to provide for the production of an electrical voltage accurately representing a digital quantity having a magnitude within particular limits and representing the particular limits for digital quantities having absolute magnitudes greater than the particular limits.

A still further object is to provide a digital-to-analogue converter which is simple, compact, inexpensive and reliable.

Another object is to provide an improved weighting network which operates in a balanced manner to produce an output voltage accurately representing the weighted value of a plurality of signals introduced to it.

A further object is to provide a novel storage circuit for producing a charge across a pair of capacitances during a first period of time and for subsequently preventing the charge from leaking from the capacitances back through the storage circuit.

Other objects and advantages will be apparent from a detailed description of the invention and from the appended drawings and claims.

In the drawings:

Figure 7 is a graph further illustrating the operation of the circuits shown in Figure 1;

Figure 1:
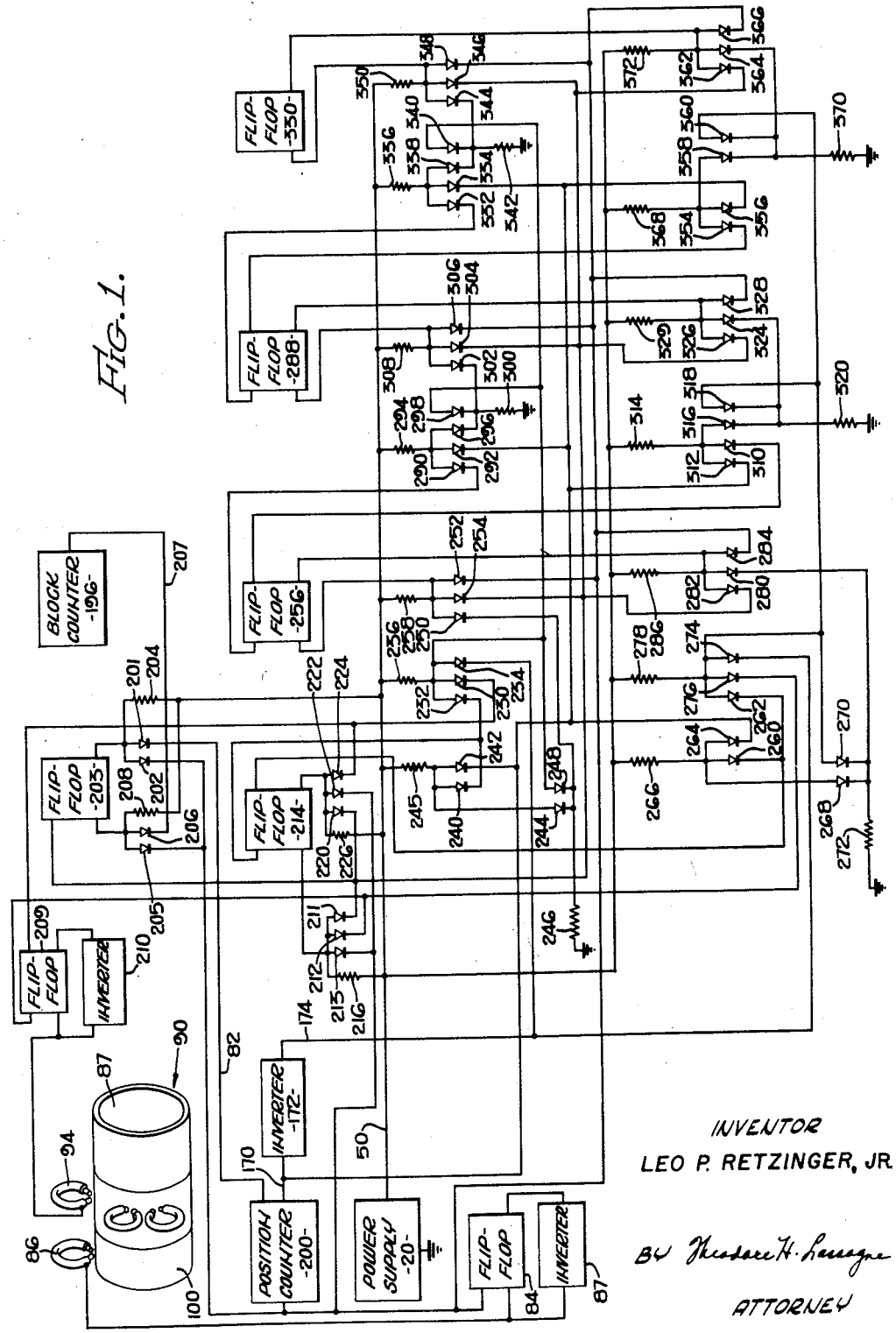
Figure 1 is a circuit diagram, somewhat in block form and somewhat in perspective, illustrating certain features included in one embodiment of this invention.

In the embodiment of the invention shown in the drawings, a number of flip-flops are included, as will be disclosed in detail hereafter. One type of flip-flop which may be used is shown in detail in Figure 5. The flip-flop includes a pair of tubes 10 and 12 respectively biased through a pair of resistances 14 and 16 from a line 18. A biasing potential such as —100 volts may be applied on the line 18 from a suitable power supply illustrated in block form at 20.

The grid of the tube 10 is connected to the plate of a diode 21, the cathode of which has a common terminal with a grounded resistance 22 and with a capacitance 23. The capacitance 23 is in turn connected to a logical network 24. The logical network 24 corresponds to various networks shown in Figures 1 and 4 and disclosed in detail hereinafter.

Similarly, a connection is made from the grid of the tube 12 to the plate of a diode 25, the cathode of which has a common terminal with a grounded resistance 26 and a capacitance 27. The resistance 26 and the capacitance 27 respectively have values corresponding to the resistance 22 and the capacitance 23. The capacitance 27 is connected to a logical network 28 corresponding to the network 24.

The cathodes of the tubes 10 and 12 are grounded. The plates of the tubes respectively have voltages applied to them through resistances 29 and 30 from a line 50. The line 50 is adapted to receive a positive voltage such as 100 volts from the power supply 20. The plate of the tube 10 is coupled to the grid of the tube 12 through a resistance 32 and a capacitance 33 connected in parallel. Similarly, the plate of the tube 12 is coupled to the grid of the tube 10 through a resistance 34 and a capacitance 36 connected in parallel. The resistance 34 and the capacitance 36 may have values corresponding to the resistance 32 and the capacitance 33, respectively.

The signals produced on the plate of the tube 10 are applied to the grid of a tube 38 through a coupling network formed by a resistance 40 and a capacitance 42 in parallel. A resistance 44 biased at approximately minus 100 volts from the line 18 is connected to the grid of the tube 38, and a resistance 46 biased at approximately —100 volts from the line 18 is connected to the cathode of the tube. The cathode of the tube 38 is connected to the cathode of a diode 48, the plate of which is grounded. The plate of the tube 38 has a positive voltage applied to it through the line 50 from the power supply 20.

In like manner, the signals produced on the plate of the tube 12 are applied through a parallel combination of a resistance 52 and a capacitance 54 to the grid of a tube 56. The resistance 52 and the capacitance 54 have values corresponding to the resistance 40 and the capacitance 42, respectively. The grid of the tube 54 is connected to a resistance 58 biased at approximately —100 volts from the line 18 and corresponding in value to the resistance 44, and the cathode of the tube 56 is connected to a resistance 60 biased at approximately —100 volts from the line 18 and corresponding in value to the resistance 46. The cathode of the tube 56 is connected to the cathode of a diode 62 having a grounded plate, and the plate of the tube 56 has a positive voltage applied to it from the line 50.

Figure 4:
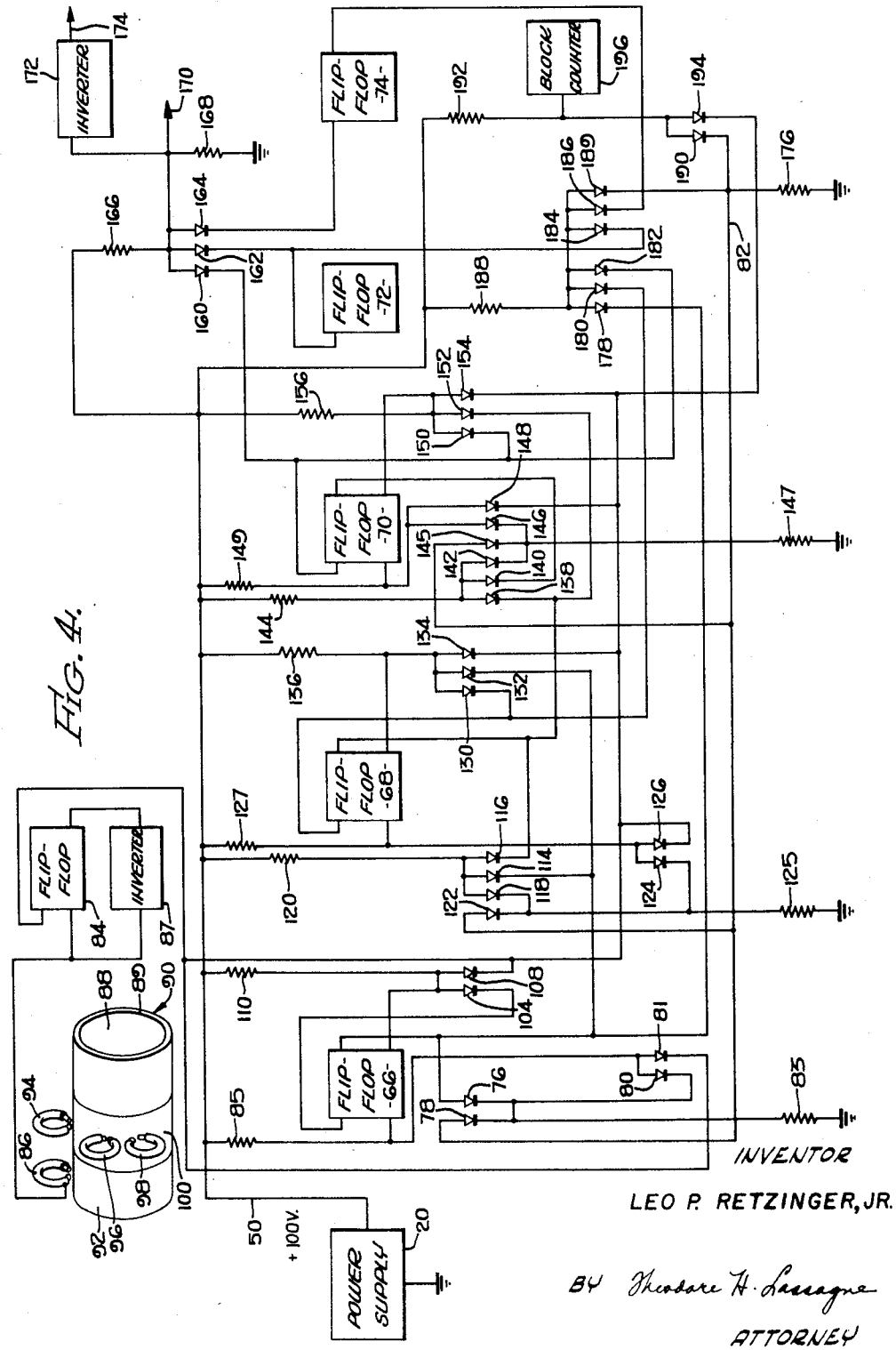
Figure 4 is a circuit diagram, somewhat in block form and somewhat in perspective, illustrating still other features included in one embodiment of this invention.
Figures 5, 6:
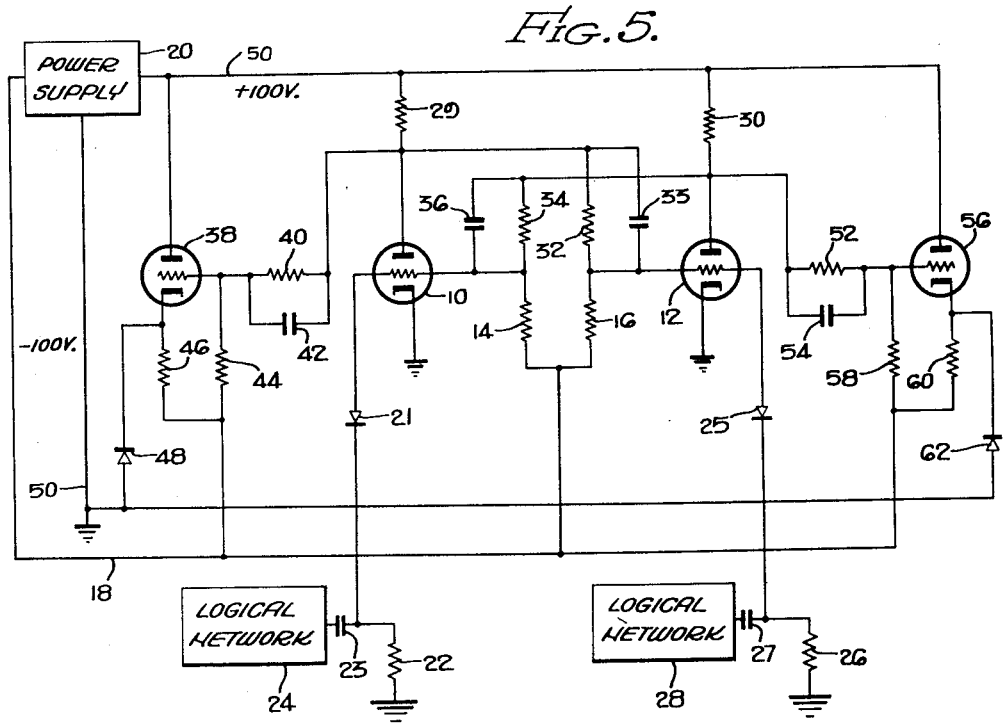
Figure 5 is a circuit diagram of one type of flip-flop which may be used as the flip-flops shown in block form in Figures 1, 2 and 4.
Figure 6 is a chart illustrating the operation of the circuits shown in Figure 1.

Flip-flops corresponding to that disclosed above and shown in detail in Figure 5 are illustrated in block form at 66, 68, 70, 72 and 74 in Figure 4. Each of the flip-flops 66, 68, 70, 72 and 74 has a pair of input terminals and a pair of output terminals. The input connections are shown extending into the block representing the flip-flop at lower left and right positions in the block, and the output connections are shown extending from the block at upper left and right positions on the block. For example, the connection extending to the lower left side of the block representing the flip-flop 66 corresponds to the connection made from the logical network 24 in Figure 5, and the connection made to the lower right side of the block corresponds to a connection made from the logical network 28 in Figure 5. Similarly, the connections from the upper left and right sides of the block representing the flip-flop 66 correspond to connections from the cathodes of the tubes 38 and 56, respectively.

The triggering of the left side of the flip-flop 66 corresponding to the tube 10 in Figure 5 is controlled by logical networks formed by diodes 76, 78, 80 and 81. The plates of the diodes 76 and 78 are respectively connected to the right output terminal in the flip-flop 66 and to an output line 82. The cathodes of the diodes 76 and 78 have a common terminal with a grounded resistance 83 and with the cathode of the diode 80. The diode 80 is associated in a network with the diode 81, the cathode of which receives signals from the left output terminal of a flip-flop 84. The plates of the diodes 80 and 81 are connected to one terminal of a resistance 85, the other terminal of which is adapted to receive voltage from the line 50.

The left input terminal of the flip-flop 84 is connected to a coil 86 and the right input terminal of the flip-flop has voltage applied to it from an inverter 87, the input terminal of which is connected to the coil 86. The coil 86 may be spaced a relatively short distance from a cylinder 88 provided with a coating 89 of a suitable magnetic material to form a magnetic drum generally indicated at 90. Notches (not shown) may be cut at spaced intervals around the periphery of the cylinder 88 at an axial position adjacent the coil 86 to induce cyclical signals in the coil 86 as the cylinder rotates. These notches may be considered to form a channel 92. A number of notches in the order of 1000 to 1800 may be cut in the channel 92.

Coils 94, 96 and 98 are disposed in contiguous relationship to the magnetic drum 90 at an axial distance sufficiently spaced from the coil 86 to make the coils 94, 96 and 98 magnetically independent of the coil 86. The coils 94, 96 and 98 are disposed adjacent the periphery of the magnetic drum 90 and are disposed substantially along a common peripheral line. In this way, the coils 94, 96 and 98 may be considered to be associated with a channel 100 carrying magnetic information and independent of the channel 92. The number of positions carrying signal information in the channel 100 may correspond to the number of notches in the channel 92.

The coil 98 is adapted to produce magnetic signals in the channel 100 in accordance with the pattern of electrical signals introduced to the coil. The coil 94 is adapted to convert the magnetic signals into a corresponding pattern of electrical signals when the magnetic drum has rotated sufficiently for the magnetic signals to appear adjacent the coil. The coil 96 is adapted to provide signals of a single polarity so that the magnetic information in the channel 100 can be erased after it has been utilized by the coil 94. In this way, the channel 100 is made available for the recording of new information in the channel by the coil 98 after the information originally in the channel has been utilized by the coil 94.

The right input terminal in the flip-flop 66 receives a voltage from the plates of diodes 104 and 108. The plates of the diodes 104 and 108 are also connected to one terminal of a resistance 110, the other terminal of which is connected to the line 50. The resistance 110 has a value corresponding to the resistance 85. Voltages are applied to the cathode of the diode 104 from the left output terminal in the flip-flop 66 and to the cathode of the diode 108 from the left output terminal in the flip-flop 84.

In addition to being applied to the plate of the diode 76, the voltage on the right output terminal in the flip-flop 66 is also applied to the cathode of a diode 114. The diode 114 is associated in a network with a diode 116, the cathode of which receives voltage from the right output terminal in the flip-flop 68. Connections are made from the plates of the diodes 114 and 116 to the plate of a diode 118 and to one terminal of a resistance 120, the other terminal of which has a voltage applied to it from the line 50. The diode 118 is associated in a network with a diode 122 having its plate connected to the output line 82.

The cathodes of the diodes 118 and 122 have a common terminal with the cathode of a diode 124 and with a grounded resistance 125 corresponding in value to the resistance 83. The diode 124 is associated in a network with a diode 126, the cathode of which receives signals from the left output terminal in the flip-flop 84. Connections are made from the plates of the diodes 124 and 126 to the left input terminal in the flip-flop 68 and to one terminal of a resistance 127 corresponding in value to the resistance 85. The other terminal of the resistance 127 has voltage applied to it from the line 50.

The right input terminal in the flip-flop 68 has a voltage applied to it from the plates of diodes 130, 132 and 134. The voltage on the plates of the diodes 130, 132 and 134 is dependent upon the flow of current through a resistance 136 connected at one end to the plates of the diodes and at the other end to the line 50. The resistance 136 has a value corresponding to the resistance 85. Connections are respectively made to the cathodes of the diodes 130, 132 and 134 from the left output terminal in the flip-flop 68, the right output terminal in the flip-flop 66 and the left output terminal of the flip-flop 84.

The left input terminal of the flip-flop 70 has voltages applied to it from logical networks similar to those controlling the voltage applied to the left input terminal in the flip-flop 68. Thus, the cathodes of biodes 138 and 140 are respectively connected to the right output terminals in the flip-flops 68 and 70. The plates of the diodes 138 and 140 have a common terminal with the plate of a diode 142 and with a resistance 144 adapted to receive voltage from the line 50. The diode 142 is associated in a network with a diode 145 having its plate connected to the output line 82.

The cathodes of the 142 and 145 have a common terminal with the cathode of a diode 146 and with a grounded resistance 147 corresponding in value to the resistance 83. The diode 146 and a diode 148 form a network, the cathode of the diode 148 being connected to the left output terminal in the flip-flop 84. The plates of the diodes 146 and 148 have a common connection with the left input terminal in the flip-flop 70 and with one terminal of a resistance 149 corresponding in value to the resistances 85 and 144. The other terminal of the resistance 149 receives voltage from the line 50.

The right input terminal in the flip-flop 70 receives its voltage from the plates of diodes 150, 152 and 154. The plates of the diodes 150, 152 and 154 are also connected to one terminal of a resistance 156, the other terminal of which is connected to the line 50. The resistance 156 has a value corresponding to the resistance 85. Connections are respectively made from the cathodes of the diodes 150, 152 and 154 to the left output terminal in the flip-flop 70, the right output terminal in the flip-flop 68 and the left output terminal in the flip-flop 84.

The input terminals in the flip-flops 72 and 74 are connected to logical networks similar to the networks controlling the operation of the flip-flops 68 and 70. The logical equations controlling the operation of these flip-flops will be disclosed in detail hereinafter. It is believed that a person skilled in the art will understand how to construct the logical networks from the logical equations hereinafter set forth and from the disclosure of the construction and operation of the networks associated with the flip-flops 68 and 70.

The left output terminals in the flip-flops 70, 72 and 74 are respectively connected to the cathodes of diodes 160, 162 and 164. The plates of the diodes 160, 162 and 164 are in turn connected to one terminal of a resistance 166, the other terminal of which has voltage applied to it from the line 50. Connections are also made from the plates of the diodes 160, 162 and 164 to a grounded resistance 168, to an output line 170 and to an input terminal of an inverter 172. An output line 174 extends from the output terminal of the inverter 172, which may be an ordinary amplifier stage.

As has been previously disclosed, the voltage on the output line 82 is introduced to the plates of such diodes as the diodes 78, 122 and 145. The voltage on the output line 82 is produced across a grounded resistance 176 connected to the output line. The voltage on the output line 82 is controlled by the voltage on the cathodes of diodes 178, 180, 182, 184 and 186. The cathodes of the diodes 178, 180, 182, 184 and 186 have voltages respectively applied to them from the right output terminal in the flip-flop 66, the left output terminal in the flip-flop 68, the left output terminal in the flip-flop 70, the left output terminal in the flip-flop 72, and the right output terminal in the flip-flop 74. The plates of the diodes 178, 180, 182, 184 and 186 are connected to the plate of a diode 189, the cathode of which has a common terminal with the resistance 176.

The voltage on the output line 82 is not only applied to the plates of the diodes 78, 122 and 145, but also to the cathode of a diode 190. A resistance 192 corresponding in value to the resistance 85 is connected between the plate of the diode 190 and the line 50. Other connections are made from the plate of the diode 190 to the plate of a diode 194 and to the input terminal of a block counter indicated in schematic form at 196 in Figure 4. The cathode of the diode 194 is adapted to receive voltage from the left output terminal in the flip-flop 84.

The block counter 196 is formed from a plurality of flip-flops corresponding to the flip-flops 66, 68, 70, 72 and 74. The networks controlling the operation of the block counter 196 are similar in construction and operation to the networks controlling the operation of the flip-flops 66, 68, 70, 72 and 74. The function of the block counter 196 will be disclosed in detail hereinafter.

The flip-flops 66, 68, 70, 72 and 74 in Figure 4 and the logical networks controlling the operation of these flip-flops are illustrated in Figure 1 as a single block indicated at 200 and designated as a "position counter." The input to the position counter 200 is shown as being controlled by the signals from the left output terminal in the flip-flop 84, these signals being introduced to the counter in a manner similar to that previously disclosed in detail. The output from the counter 200 is shown in Figure 1 as being introduced through the line 170 to the inverter 172. This is in accordance with the connections shown in Figure 4 and disclosed above.

The output lead 82 also shown in Figure 1 extends from the counter 200 to the cathode of a diode 201 associated in a network with a diode 202. The cathode of the diode 202 has voltage applied to it from the left output terminal in the flip-flop 84. The plates of the diodes 201 and 202 are connected to the right input terminal in a flip-flop 203 and to one terminal of a resistance 204 corresponding in value to the resistance 85 shown in Figure 4. The other terminal of the resistance 204 receives the voltage on the line 50.

A network formed from diodes 205 and 206 controls the passage of triggering signals to the left input terminal in the flip-flop 203. Voltages are respectively applied to the cathodes of the diodes 205 and 206 from the left output terminal in the flip-flop 84 and through a line 207 from the block counter 196. The plates of the diodes 205 and 206 are connected to the left input terminal in the flip-flop 203 and to one terminal of a resistance 208 corresponding in value to the resistance 204. The other terminal of the resistance 208 receives voltage from the line 50.

The left input terminal in a flip-flop 209 receives voltage from the coil 94 associated with the channel 169 of the magnetic drum 90. The right input terminal of the flip-flop 209 is connected to an inverter 210, the input terminal of which receives voltage from the coil 94. The inverter 210 may be similar to the inverter 172 and may be formed from an ordinary amplifier stage.

A connection is made from the left output terminal of the flip-flop 203 to the cathode of a diode 211 associated in a network with diodes 212 and 213. Voltages are respectively applied to the cathodes of the diodes 212 and 213 from the left output terminals in the flip-flops 209 and 84. The plates of the diodes 211, 212 and 213 are connected to the left input terminal in a flip-flop 214 and to one terminal of a resistance 216 having a value corresponding to the resistance 204. The other terminal of the resistance 216 receives voltage through the line 50 from the power supply 20, which is also shown in Figures 4 and 5.

The voltage on the left output terminal of the flip-flop 203 is applied to the cathode of a diode 220 as well as to the cathode of the diode 211. The diode 220 is associated in a logical network with diodes 222 and 224. Connections are made to the cathodes of the diodes 222 and 224 from the left output terminal in the flip-flop 84 and the right output terminal in the flip-flop 209, respectively. The plates of the diodes 220, 222 and 224 are connected to the right input terminal in the flip-flop 214 and to one terminal of a resistance 226 having its other terminal connected to the line 50. The resistance 226 has a value corresponding to the resistance 204.

In addition to being applied to the cathode of the diode 224, the voltage on the right output terminal in the flip-flop 209 is introduced to the cathode of a diode 230. The diode 230 is associated in a logical network with diodes 232 and 234. The cathode of the diode 232 receives voltage from the left output terminal in the flip-flop 214, and the cathode of the diode 234 receives voltage from the output terminal of the inverter 172. A resistance 236 corresponding in value to the resistance 204 is connected between the plates of the diodes 230, 232 and 234 and the line 50.

The cathodes of diodes 240 and 242 are respectively connected to the left output terminal in the flip-flop 214 and through the line 170 to the counter 200. Connections are made from the plates of the diodes 240 and 242 to the plate of a diode 244 and to one terminal of a resistance 245, the other terminal of which has voltage applied to it from the line 50. The cathode of the diode has a common terminal with a grounded resistance 246 and with the cathodes of diodes 248 and 250. The plate of the diode 248 has a voltage applied to it from the plates of the diodes 230, 232 and 234.

The diode 250 is associated in a logical network with diodes 252 and 254. Voltages are respectively applied to the cathodes of the diodes 252 and 254 from the left output terminals in the flip-flops 84 and 203. The plates of the diodes 250, 252 and 254 are connected to the left input terminal in a flip-flop 256 and to one terminal of a resistance 258 corresponding in value to the resistance 204. The other terminal of the resistance 258 receives voltage from the line 50.

The right output terminal in the flip-flop 214 is connected to the cathodes of diodes 260 and 262. The diode 260 is associated with a diode 264, the cathode of which has a voltage applied to it through the line 170 from the counter 200. A resistance 266 corresponding in value to the resistance 216 is connected between the plates of the diodes 260 and 264 and the line 50. The plates of the diodes 260 and 264 are also connected to the plate of a diode 268, the cathode of which has a common terminal with the cathode of a diode 270 and with a grounded resistance 272 corresponding in value to the resistance 246.

The plates of the diodes 262 and 270 and the plates of diodes 274 and 276 receive voltage through a resistance 278 from the line 50. The cathode of the diodes 274 and 276 respectively have voltages applied to them from the inverter 172 and from the left output terminal in the flip-flop 209.

The cathode of the diode 268 is connected to the cathode of a diode 280 as well as to the cathode of the diode 270. The diode 280 is associated in a network with diodes 282 and 284. The cathode of the diode 282 receives the voltage on the left output terminal in the flip-flop 203 and the cathode of the diode 284 receives the signals from the left output terminal in the flip-flop 84. A resistance 286 corresponding in value to the resistance 204 is connected between the line 50 and the plates of the diodes 280, 282 and 284 to control the voltage on the plates. This voltage is introduced to the right input terminal in the flip-flop 256.

The voltage applied to the left input terminal in a flip-flop 288 is controlled by logical networks similar to those controlling the voltage applied to the left input terminal in the flip-flop 256. One of these logical networks is formed by diodes 290 and 292. The cathodes of the diodes 290 and 292 are respectively connected to the left output terminal in the flip-flop 256 and through the line 170 to the position counter 200. A resistance 294 corresponding in value to the resistance 204 is connected between the plates of the diodes 290 and 292 and the line 50. The plates of the diodes 290 and 292 are also connected to the plate of a diode 296 associated in a network with a diode 298. The plate of the diode 298 has a common terminal with the plates of the diodes 230, 232 and 234.

Connections are made from the cathodes of the diodes 296 and 298 to a grounded resistance 300 and to the cathode of a diode 302 associated in a network with diodes 304 and 306. Voltages are respectively applied to the cathodes of the diodes 304 and 306 from the left output terminals in the flip-flops 203 and 84. The voltage on the plates of the diodes 302, 304 and 306 is controlled by a resistance 308 connected between the plates and the line 50. The voltage on the plates of the diodes 302, 304 and 306 is applied to the left input terminal of the flip-flop 288.

The right input terminal in the flip-flop 288 has voltages applied to it from logical networks corresponding to the networks controlling the application of voltage to the right input terminal in the flip-flop 256. One of the networks controlling the voltage applied to the right input terminal in the flip-flop 218 is formed by diodes 310 and 312. Connections are made to the cathodes of the diodes 310 and 312 from the right output terminal in the flip-flop 256 and through the line 170 from the position counter 200. A resistance 314 corresponding in value to the resistance 204 is connected between the plates of the diodes 310 and 312 and the line 50.

The plate of a diode 316 is connected to the plates of the diodes 310 and 312. The diode 316 is associated in a network with a diode 318 having its plate connected to the plates of the diodes 262, 274 and 276. The cathodes of the diodes 316 and 318 are connected to a resistance 320 corresponding in value to the resistances 246 and 300. The cathodes of the diodes 316 and 318 are also connected to the cathode of a diode 324 associated in a network with diodes 326 and 328. The cathodes of the diodes 326 and 328 respectively receive voltages from the left output terminals in the flip-flops 203 and 84. The plates of the diodes are connected to the right input terminal in the flip-flop 288 and to one terminal of a resistance 329 corresponding in value to the resistance 216. The other terminal of the resistance 329 has voltage applied to it from the line 50.

The operation of a flip-flop 330 is controlled in a manner similar to that disclosed above for the flip-flops 256 and 288. One of the networks controlling the operation of the flip-flop 330 is formed from diodes 332 and 334. The cathodes of the diodes 332 and 334 respectively have voltages applied to them from the left output terminal in the flip-flop 288 and through the line 170 from the position counter 200. A resistance 336 corresponding in value to the resistance 204 is connected between the plates of the diodes 332 and 334 and the line 50. The plates of the diodes 332 and 334 are also connected to the plate of a diode with 338 associated in a network with a diode 340.

Voltage is applied to the plate of the diode 340 from the plates of the diodes 230, 232 and 234. The cathodes of the diodes 338 and 340 are connected to a grounded resistance 342 corresponding in value to the resistance 246 and are also connected to the cathode of a diode 344. The diode 344 is associated in a network with diodes 346 and 348. The cathodes of the diodes 346 and 348 respectively receive voltages from the left output terminals in the flip-flops 203 and 84. Connections are made from the plates of the diodes 344, 346 and 348 to the left input terminal in the flip-flop 330 and to one terminal of a resistance 350 corresponding in value to the resistance 216. The other terminal of the resistance 350 is connected to the line 50.

Networks formed by diodes 354 and 356, by diodes 358 and 360 and by diodes 362, 364 and 366 control the voltage applied to the right input terminal in the flip-flop 330. The cathodes of the diodes 354 and 356 are respectively connected to the right output terminal in the flip-flop 288 and through the line 170 to the position counter 200. The plates of the diodes 354 and 356 have a common terminal with the plate of the diode 358 and with a resistance 368 having a voltage applied to it from the line 50. The resistance 368 corresponds in value to the resistance 204.

Voltage is applied to the plate of the diode 360 from the plates of the diodes 262, 274 and 276. The cathodes of the diodes 358 and 360 have a common terminal with a grounded resistance 370 corresponding in value to the resistance 246. The cathodes of the diodes 358 and 360 also have a common terminal with the cathode of the diode 364, which is associated with the diodes 362 and 366 as previously disclosed. The cathodes of the diodes 362 and 366 are connected to the left output terminals in the flip-flops 203 and 84, respectively. The plates of the diodes 362, 364 and 366 are connected to the right input terminal in the flip-flop 330 and to one terminal of a resistance 372 corresponding in value to the resistance 204. The other terminal of the resistance 372 has voltage applied to it from the line 50.

Figure 2:
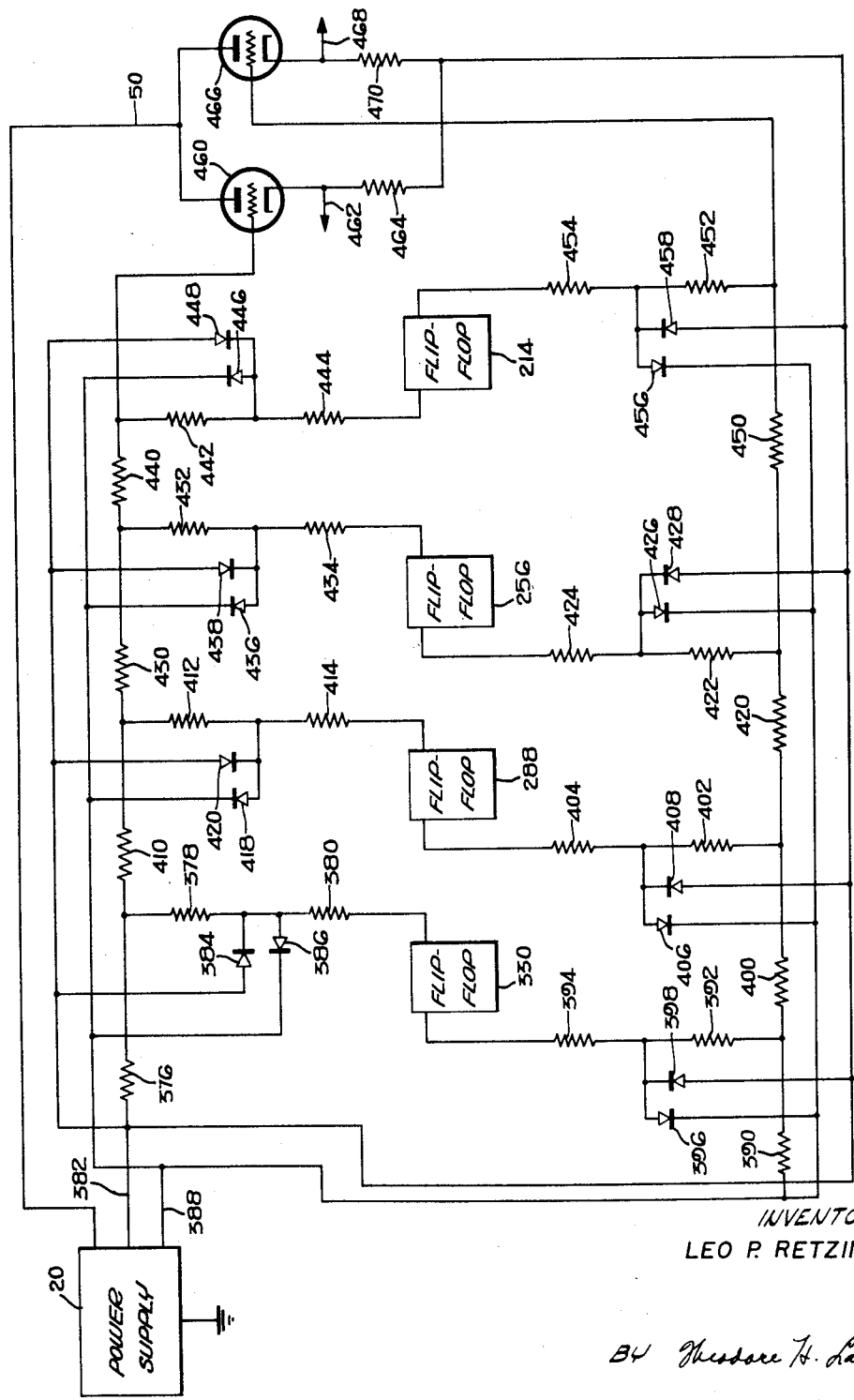
Figure 2 is a circuit diagram, somewhat in block form, illustrating other features included in one embodiment of this invention and specifically shows a balanced weighting network included in the embodiment.

The flip-flops 214, 256, 288 and 330 shown in block form in Figure 1 are also illustrated in block form in Figure 2. As shown in Figure 2, the flip-flops 214, 256, 288 and 330 are arranged in a balanced weighting network which also includes a plurality of resistances having particular values. For example, resistances 376, 378 and 380 are connected in series between a line 382 and the right output terminal in the flip-flop 330. The line 382 is adapted to receive a potential of approximately +10 volts from the power supply 20. The resistances 376 and 378 have values of approximately 30,000 ohms and the resistance 380 has a value of approximately 4,300 ohms.

The cathode of a diode 384 is connected to the common terminal between the resistances 378 and 380 and the plate of the diode is connected to the line 382. The plate of a diode 386 has a common terminal with the cathode of the diode 384 and the cathode of the diode has voltage applied to it from a line 388. The line 388 is adapted to recive a potential of approximately +30 volts from the power supply 20.

In like manner, resistances 390, 392 and 394 are in series between the line 388 and the left output terminal in the flip-flop 330. The resistances 390, 392 and 394 have values corresponding to the resistances 376, 378 and 380, respectively. Connections are made to the plate of a diode 396 and to the cathode of a diode 398 from the common terminal between the resistances 392 and 394. The cathode of the diode 396 receives voltage from the line 388 and the plate of the diode 398 receives voltage from the line 382.

Resistances 400, 402 and 404 extend in a series circuit from the common terminal between the resistances 390 and 392 to the left output terminal in the flip-flop 288. The resistances 402 and 404 have values corresponding to the resistances 392 and 394, respectively and the resistance 400 has a value of approximately 15,000 ohms. The plate of a diode 406 and the cathode of a diode 408 are connected to the common terminal between the resistances 402 and 404. Voltages are respectively applied to the cathode of the diode 406 and to the plate of the diode 408 from the lines 388 and 382.

Resistances 410, 412 and 414 are connected in series between the right output terminal of the flip-flop 288 and the common terminal between the resistances 376 and 378. The resistances 410, 412 and 414 have values corresponding substantially to the resistances 400, 402 and 404, respectively. Connections are made from the plate of a diode 418 and the cathode of a diode 420 to the common terminal between the resistances 412 and 414. The cathode of the diorde 418 and the plate of the diode 420 have common terminals with the lines 388 and 382, respectively.

A resistance 420 is conected to the common terminal between the resistances 400 and 402. Resistances 422 and 424 are in series with the resistance 400 and the left output terminal in the flip-flop 256. The resistances 420, 422 and 424 have values respectively corresponding to the resistances 400, 402 and 404. The plate of a diode 426 and the cathode of a diode 428 are connected to the common terminal between the resistances 422 and 424. The cathode of the diode 426 and the plate of the diode 428 respectively have voltages applied to them from the lines 388 and 382.

Resistances 430, 432 and 434 extend in a series circuit from the common terminal between the resistances 410 and 412 to the right output terminal in the flip-flop 256. The values of the resistances 430, 432 and 434 correspond substantially to the values of the resistances 420, 422 and 424, respectively. The resistances 432 and 434 have a common terminal with the plate of a diode 436 and the cathode of a diode 438. Connections are respectively made from the cathode of the diode 436 and the plate of the diode 438 to the lines 388 and 382, respectively.

The flip-flop 214 is connected in an inverse arrangement relative to the connections provided for the flip-flops 330, 288 and 256. For example, resistances 440, 442 and 444 extend in series from the common terminal between the resistances 430 and 432 to the left output terminal in the flip-flop 214. The resistance 442 has a value of approximately 22,500 ohms; the resistance 444 corresponds in value to the resistance 434; and the resistance 440 has a value of approximately 7,500 ohms. The terminal common to the resistances 442 and 444 is connected to the plate of a diode 446 and the cathode of a diode 448. Voltages are respectively applied to the cathode of the diode 446 and the plate of the diode 448 from the lines 388 and 382.

The right output terminal in the flip-flop 214 and the common terminal between the resistances 420 and 422 are joined by a series circuit including resistances 450, 452 and 454. The values of the resistances 450, 452 and 454 correspond substantially to the values of the resistances 440, 442 and 444, respectively. The terminal common to the resistances 452 and 454 is connected to the plate of a diode 456 and the cathode of a diode 458. Connections are made from the cathode of the diode 456 and the plate of the diode 458 to the lines 388 and 382, respectively.

The common terminal between the resistances 440 and 442 is connected to the grid of a vacuum tube 460, which may be a type 6111. The plate of the tube 460 has a potential of approximately +100 volts applied to it from the line 50 also shown in Figure 5. Connections are made from the cathode of the tube 460 to an output line 462 and to one terminal of a resistance 464 having a value of approximately 3,000 ohms. Voltage is applied to the other terminal of the resistance 464 from the line 382.

Similarly, the voltage on the terminal common to the resistances 450 and 452 is applied to the grid of a tube 466, which may be of a type similar to the tube 460. The plate of the tube 466 receives a potential of approximately +100 volts from the line 50. The cathode of the tube 466 is connected to an output line 468 and to one terminal of a resistance 470 corresponding in value to the resistance 464. The other terminal of the resistance 470 has a voltage applied to it from the line 382.

Figure 3:
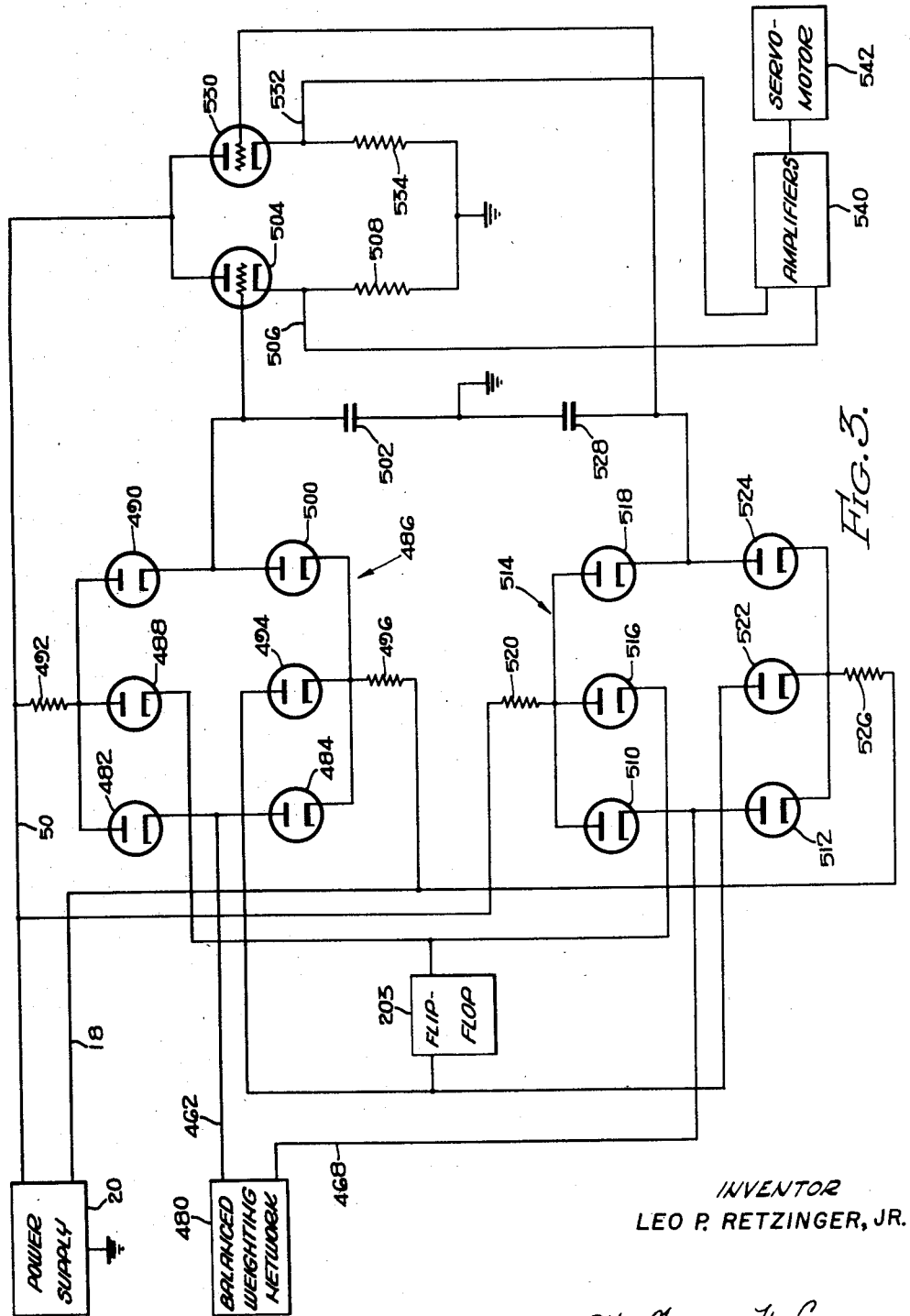
Figure 3 is a circuit diagram, somewhat in block form, illustrating still other features included in one embodiment of this invention and specifically shows a storage circuit formed from a balanced pair of diode bridges.

The balanced weighting network shown in detail in Figure 2 is illustrated in block form at 480 in Figure 3. The ouput terminals 462 and 468 are shown as extending from the network 480. The line 462 is connected to the cathode of a diode 482 and the plate of a diode 484 forming a part of a diode bridge generally indicated at 486. The plate of the diode 482 has a common terminal with the plates of diodes 488 and 490 and with a resistance 492 having a positive potential of approximately 100 volts applied to it from the line 50. The resistance 492 may have a value of approximately 1.0 megohm.

The cathode of the diode 484 has voltage applied to it from the right output terminal in the flip-flop 203 also shown in Figure 1. The voltage on the left input terminal of the flip-flop 203 is applied to the plate of a diode 494 having its cathode connected to the cathode of the diode 484 and to one terminal of a resistance 496. The other terminal of the resistance 496 has a negative potential such as −100 volts applied to it through the line 18 from the power supply 20. The resistance 496 has a value such as 1.0 megohm corresponding to the value of the resistance 492.

The cathode of the diode 494 not only has a common terminal with the cathode of the diode 484 but also with the cathode of a diode 500. The plate of the diode 500 is connected to the cathode of the diode 490 and to the ungrounded terminal of a grounded capacitance 502. The capacitance 502 has a value such as .005 microfarad.

The voltage across the capacitance 502 is applied to the grid of a tube 504, the plate of which receives the positive potential on the line 50. The cathode of the tube 504 has a common terminal with an output line 506 and with the ungrounded terminal of a grounded resistance 508. The resistance 508 has a suitable value such as approximately 5,600 ohms.

Just as the output line 462 is connected to the cathode of the diode 482 and the plate of the diode 484, the output line 468 is connected to the cathode of a diode 510 and the plate of a diode 512 forming part of a diode bridge generally indicated at 514. The plate of the diode 510 has a common terminal with the plates of diodes 516 and 518 and with a resistance 520 having a value corresponding to that of the resistance 492. The resistance 520 has a positive potential applied to it from the line 50.

Similarly, connections are made from the cathode of the diode 512 to the cathodes of diodes 522 and 524 and to one terminal of a resistance 526, the other terminal of which receives negative voltage from the line 18. The resistance 526 corresponds in value to the resistance 492.

Voltages are respectively applied to the plate of the diode 522 and to the cathode of the diode 516 from the left and right output terminals in the flip-flop 203. The plate of the diode 524 has a common terminal with the cathode of the diode 518 and with a grounded capacitance 528 corresponding in value to the capacitance 502. The voltage across the capacitance 528 is applied to the grid of a tube 530 having its plate connected to the line 50. An output line 532 and a grounded resistance 534 are connected to the cathode of the tube 530. The resistance 534 has a value corresponding substantially to that of the resistance 508.

The voltages on the output lines 506 and 532 are introduced to the input terminals of amplifiers 540. The amplifiers 540 may be magnetic amplifiers such as disclosed in co-pending application, Serial Number 412,796, filed February 26, 1954, now Patent Number 2,827,603, issued Mar. 18, 1958, by Joseph A. Fingerett and Frank A. Hill. The signals from the magnetic amplifiers 540 are in turn introduced to a servo motor 542 which is adapted to drive an output mechanism such as a shaft and discs mounted on the shaft. The discs may be similar to that disclosed in co-pending application, Serial Number 467,154, filed November 5, 1954, by Leo P. Retzinger, Jr.

The tubes 10 and 12 in Figure 5 are so interconnected that only one of the tubes can be conductive at any one time. For example, the tube 12 may be conductive and the tube 10 nonconductive at a particular instant. Since the tube 12 is conductive, a relatively large current flows through a circuit including the power supply 20, the line 50, the resistance 30 and the tube. This current produces a relatively large voltage drop across the resistance 30 and causes a relatively low voltage to be produced on the plate of the tube 12. The low voltage on the plate of the tube 12 causes a low voltage to be introduced to the grid of the tube 56 through the coupling network formed by the resistance 52 and the capacitance 54. Since the grid of the tube 56 has a relatively low voltage applied to it, the tube is cut off and a potential approximating 0 volt is produced on the cathode of the tube. A potential of approximately 0 volt is produced at the cathode of the tube 56 because of the operation of the diode 56 in maintaining the cathode of the diode at the same potential as the ground on the plate of the diode.

The low voltage on the plate of the tube 12 also causes a low voltage to be introduced to the grid of the tube 10 through the coupling network formed by the resistance 34 and the capacitance 36. This voltage maintains the tube 10 cut off. Since no current flows through the tube 10 and a limited current flows through a circuit including the resistances 29, 32 and 16, a relatively small voltage drop is produced across the resistance 29. This causes a relatively high potential to be produced on the plate of the tube 10. A resultant high potential is introduced to the grid of the tube 38 through the coupling network formed by the resistance 40 and the capacitance 42 to make the tube 38 conductive. The current flowing through the tube 38 and the resistance 46 causes a relatively high potential to be produced across the resistance. This potential is in the order of +30 volts.

When the tube 12 is conductive and the tube 10 is cut off, the introduction of a negative pulse of voltage from the logical network 24 to the grid of the tube 10 has no effect. However, a negative pulse of voltage from the logical network 28 is differentiated by the capacitance 27 and the resistance 26 to produce a relatively sharp triggering signal of negative polarity. This signal passes through the diode 25, which is included to prevent the passage of signals of positive polarity. The negative triggering signal passes to the grid of the tube 12 and cuts off the tube. The interruption of current flow through the tube 12 causes the voltage on the plate of the tube to rise to a relatively high value. A resultant high voltage is introduced to the grid of the tube 56 to render the tube conductive for the production of a relatively high potential such as +30 volts across the resistance 60.

A relatively high voltage is also introduced from the plate of the tube 12 to the grid of the tube 10 to render the tube 10 conductive. The resultant flow of current through the resistance 29 and the tube 10 causes a relatively low potential to be produced on the plate of the tube. This in turn causes a low voltage to be introduced to the grid of the tube 38 so that the tube 38 becomes cut off and a low voltage such as 0 volt is produced on the cathode of the tube. The potential of 0 volt on the cathode of the tube 38 results from the operation of the diode 48.

A negative pulse of voltage subsequently produced in the logical network 24 is differentiated by the capacitance 23 and the resistance 22 to produce a relatively sharp triggering signal. This signal passes through the diode 21 to the grid of the tube 10 to cut off the tube 10 and to render the tube 12 conductive. This in turn produces a relatively high potential on the cathode of the tube 38 and a relatively low potential on the cathode of the tube 56. In this way, the operation of the flip-flop shown in Figure 5 is dependent at any instant upon the signals introduced to the flip-flop from the logical networks 24 and 28.

In accordance with the introduction of the signals from the logical networks 24 and 28, a relatively high potential approximating +30 volts is produced at any instant on the cathode of one of the tubes 38 and 56 and a relatively low potential approximating 0 volt is produced on the cathode of the other tube. Each of the tubes 38 and 56 serves in a cathode follower stage for preventing loading of the flip-flop and for improving the match in impedances between the outputs from the flip-flop and the following stages.

Although only one type of flip-flop has been shown in Figure 5 and disclosed above, it should be appreciated that other types of flip-flops may be used. Actually, any circuit may be used which serves as a bistable member to simultaneously produce a first voltage of high amplitude and a second voltage of low amplitude and vice versa. It should also be appreciated that amplifiers are often used with the flip-flops, especially when the operation of the flip-flops is controlled by signals from coils such as the coils 86 and 94 in Figures 1 and 4. However, such amplifier stages are not shown in the drawings for purposes of simplification.

The flip-flop shown in Figure 5 and disclosed above is similar in construction and operation to the flip-flops 66, 68, 70, 72 and 74 shown in Figure 4. The flip-flops 66, 68, 70, 72 and 74 are adapted to provide a count from "1" to "18" of the pulses introduced to the flip-flops from the coil 86 as the magnetic drum 90 rotates. Signals are induced in the coil 86 as the drum 90 rotates because of the notches provided at spaced intervals in the channel 92 and because of the magnetization permanently provided in the channel. Triggering signals alternately pass from the coil 86 to the left and right input terminals in the flip-flop 84 on successive half cycles of the signals induced in the coil. In this way, the voltage on the left output terminal in the flip-flop 84 changes from a high value to a low value once in each cycle of alternating voltage.

The flip-flops 66, 68, 70, 72 and 74 are initially in a state of operation in which a relatively high voltage is produced on the left output terminal of each of the flip-flops. This corresponds to a count of "1." The high voltage on the left output terminal in the flip-flop 66 is introduced to the cathode of the diode 104. Since a relatively high voltage is also introduced to the cathode of the diode 108 from the flip-flop 84 during the positive half of each cyclical signal induced in the coil 86, relatively little current is able to flow through the resistance 110 and the diodes and the voltage on the plates of the diodes remains relatively high.

Upon the production of a relatively low voltage on the left output terminal in the flip-flop 84, the cathode of the diode 108 receives a relatively low voltage and current flows through the resistance 110 and the diode. This current produces a voltage drop across the resistance 110, such that a negative pulse of voltage is produced on the plates of the diodes 104 and 108. This negative pulse of voltage is differentiated in the flip-flop 66 and is introduced as a triggering signal to the right input terminal in the flip-flop to trigger the flip-flop into its alternate state of operation. In this state of operation, a relatively high voltage is produced on the right output terminal of the flip-flop 66. The production of a relatively high voltage on the right output terminal of the flip-flop 66 causes a relatively low voltage to be produced on the left output terminal of the flip-flop, as previously disclosed.

The relatively high voltage on the right output terminal of the flip-flop 66 for a count of "2" is introduced to the plate of the diode 76. This high voltage causes a relatively large current to flow through the diode 76 and the resistance 83 and a relatively high voltage to be produced across the resistance.

The high voltage produced across the resistance 83 is introduced to the cathode of the diode 80, which is associated in an "and" network with the diode 81. A high voltage is also introduced to the cathode of the diode 81 from the left output terminal in the flip-flop 84 during at least a portion of each cyclical signal induced in the coil. Because of the high voltages on the cathodes of the diodes 80 and 81, relatively little current is able to flow through the resistance 85 and either of the diodes. Since only a small voltage drop is produced across the resistance 85, a relatively high voltage is produced on the plates of the diodes 80 and 81.

When a low voltage is produced on the left output terminal of the flip-flop 84, a corresponding negative voltage is introduced to the cathode of the diode 81. This voltage causes a relatively large current to flow through a circuit including the power supply 20, the line 50, the resistance 85 and the diode 81. The relatively large current flowing through the resistance 85 produces a considerable voltage drop across the resistance and causes a pulse of voltage to be produced on the plates of the diodes 80 and 81. The negative pulse of voltage is differentiated in the flip-flop 66 and is introduced as a triggering signal to the left input terminal in the flip-flop. This negative triggering signal causes the left tube in the flip-flop 66 to become cut off so that a relatively high voltage is produced on the left output terminal of the flip-flop. At the same time, a relatively low voltage is produced on the right output terminal in the flip-flop 66 as fully disclosed above.

It will be seen that a relatively high voltage is produced on the right output terminal in the flip-flop 66 upon the induction of odd-numbered clock signals in the coil 86. For example, a relatively high voltage is produced on the right output terminal in the flip-flop 66 upon the induction of first, third, fifth, etc., signals in the coil 86. Similarly, a relatively high voltage is produced on the left output terminal of the flip-flop 66 when second, fourth, sixth, etc., signals are induced in the coil 86.

The production of a relatively high voltage on the left output terminal of the flip-flop 66 can be logically expressed as $$b_1 = \bar{B}_1 C \qquad (1)$$

where:

$b_1$ = a triggering signal introduced to the left input terminal in the flip-flop 66;

$\bar{B}_1$ = a relatively high voltage on the right output terminal in the flip-flop 66; and $C$ = a relatively high voltage on the left output terminal in the flip-flop 84.

In accordance with standard computer terminology, the terms "B," and "C" written together indicate an "and" network, such that a signal cannot pass unless both terms are simultaneously true.

Similarly, the production of a relatively high voltage on the right output terminal of the flip-flop 66 can be logically expressed as $$\bar{b}_1 = B_1 C \quad (2)$$

where:

$\bar{b}_1$ = a triggering signal introduced to the right input terminal in the flip-flop 66;
$B_1$ = a relatively high voltage on the left output terminal in the flip-flop 66; and
$C$ = a relatively high voltage on the left output terminal in the flip-flop 84.

As previously disclosed, a relatively high voltage is produced on the right output terminal in the flip-flop 66 after the introduction of the first signal from the flip-flop 84. This voltage is introduced to the cathode of the diode 132. A relatively high voltage is also introduced at the same time to the cathode of the diode 130 from the left output terminal in the flip-flop 68. This limits the current flowing through the resistance 136 and the diodes 130, 132 and 134.

When the voltage on the right output terminal of the flip-flop 66 changes from a high to a low value upon the induction of the second clock signal in the coil 86, the voltage on the cathode of the diode 132 becomes low. This produces a flow of current through the resistance 136 and the diode 132 and causes a negative pulse of voltage to be produced on the plate of the diode 132. The negative pulse of voltage is differentiated in the flip-flop 68 and is introduced as a relatively sharp signal to the right input terminal of the flip-flop to trigger the flip-flop into its alternate state of operation. In this way, a high voltage is produced on the right output terminal of the flip-flop 68 and a low voltage is produced on the left output terminal of the flip-flop.

A triggering signal is introduced to the right input terminal in the flip-flop 68 in accordance with the logical explanation $$\bar{b}_2 = \bar{B}_1 B_2 C \quad (3)$$

where:

$\bar{b}_2$ = a triggering signal introduced to the right input terminal in the flip-flop 68;
$B_2$ = a relatively high voltage on the left output terminal in the flip-flop 68; and
The other terms have previously been defined.

The relatively high voltage on the right output terminal in the flip-flop 68 is introduced to the cathode of the diode 116. When the flip-flop 66 is triggered once again to produce a relatively high voltage on the right output terminal of the flip-flop, this voltage is introduced to the cathode of the diode 114. This limits the current flowing through the resistance 120 and the diodes 114 and 116 and causes a relatively high voltage to be produced on the plates of the diodes.

As a result of the high voltage on the plates of the diodes 114 and 116, a relatively large current flows through the diode 118 and the resistance 125 and produces a high voltage across the resistance. This voltage is introduced to the cathode of the diode 124, which is associated in a network with the diode 126. Since a relatively high voltage is introduced to the cathode of the diode 126 from the left output terminal in the flip-flop 84 during at least a portion of each cyclical signal, only a limited current is able to flow through the resistance 127 and the diodes 124 and 126. This causes a high voltage to be produced on the plates of the diodes.

Upon the occurrence of the next clock signal in the coil 86, a relatively low voltage is produced on the right output terminal of the flip-flop 66 as previously disclosed. This voltage causes a relatively large current to flow through the resistance 120 and the diode 114. The resultant low voltage on the plate of the diode 114 limits the flow of current through the diode 118 and the resistance 125 so that a low voltage is produced across the resistance for introduction to the cathode of the diode 124. This voltage causes a relatively large current to flow through the resistance 127 and the diode 124. The voltage drop produced across the resistance 127 by the flow of current is differentiated and a negative triggering signal is produced for introduction to the left input terminal in the flip-flop 68. The triggering signal passing to the left input terminal in the flip-flop 68 causes a relatively high voltage to be produced on the left output terminal in the flip-flop and a relatively low voltage to be produced on the right output terminal in the flip-flop.

The introduction of a triggering signal to the left input terminal in the flip-flop 68 is controlled by the logical equations:

$$b_2 = \bar{B}_1 B_2 C \quad (4)$$

where:

$b_2$ = a triggering signal introduced to the left input terminal in the flip-flop 68;
$\bar{B}_2$ = a relatively high voltage on the right output terminal in the flip-flop 68; and
The other terms have previously been defined.

Just as the triggering of the flip-flop 68 is controlled by the voltage on the right output terminal in the flip-flop 66, the operation of the flip-flop 70 is controlled by the voltage on the right output terminal in the flip-flop 68. The triggering signals introduced to the left input terminal in the flip-flop 70 are controlled in part by the operation of the networks formed by the diodes 138 and 140, the diodes 142 and 145 and the diodes 146 and 148. The operation of these networks is similar to those formed by the diodes 114 and 116, the diodes 118 and 122 and the diodes 124 and 126, as disclosed above. In this way, the logical equation controlling the production of a relatively high voltage on the left output terminal in the flip-flop 70 can be written as $$b_3 = \bar{B}_2 \bar{B}_3 C \quad (5)$$

where:

$b_3$ = a triggering signal introduced to the left input terminal in the flip-flop 70;
$\bar{B}$ = a relatively high voltage on the right output terminal in the flip-flop 70; and
The other terms have previously been defined.

Similarly, a relatively high voltage is produced on the right output terminal in the flip-flop 70 in accordance with the logical equation $$\bar{b}_3 = \bar{B}_2 B_3 C \quad (6)$$

where:

$b_3$ = a triggering signal introduced to the right input terminal in the flip-flop 70;
$B_3$ = a relatively high voltage on the left output terminal in the flip-flop 70; and
The other terms have previously been defined.

The network formed by the diodes 150, 152 and 154 operates to control the passage of triggering signals to the right input terminal in the flip-flop 70 in accordance with Equation 6.

The operation of the flip-flop 72 can be expressed by logical equations similar to those disclosed above. For example, the logical equation controlling the introduction of a triggering signal to the left input terminal in the flip-flop 72 can be expressed as $$b_4 = \bar{B}_3 \bar{B}_4 C \tag{7}$$

where:

$b_4$ = the introduction of a triggering signal to the left input terminal in the flip-flop 72;

$\bar{B}_4$ = a relatively high voltage on the right output terminal in the flip-flop 72; and The other terms have previously been defined.

It is believed that a person skilled in the art would understand how to build such a network from Equation 7 and from the previous discussion of the construction and operation of the networks controlling the operation of the flip-flops 68 and 70.

Similarly, triggering signals are introduced to the right input terminal in the flip-flop 72 in accordance with the operation of a network logically expressed as $$\bar{b}_4 = \bar{B}_3 B_4 C \tag{8}$$

where:

$\bar{b}_4$ = the introduction of a triggering signal to the right input terminal in the flip-flop 72;

$B_4$ = a relatively high voltage on the left output terminal in the flip-flop 72; and The other terms have previously been defined.

The flip-flop 74 operates in a manner similar to the flip-flop 72 in that the flip-flop 74 is triggered every time that the voltage on the right output terminal in the flip-flop 72 changes from a high to a low value. The passage of triggering signals to the left input terminal in the flip-flop 74 can be logically expressed as $$b_5 = \bar{B}_4 \bar{B}_5 C \tag{9}$$

where:

$b_5$ = the introduction of a triggering signal to the left input terminal in the flip-flop 74;

$\bar{B}_5$ = a relatively high voltage on the right output terminal in the flip-flop 74; and The other terms have previously been defined.

In like manner, the right input terminal of the flip-flop 74 receives signals in accordance with the logical expression $$\bar{b}_5 = \bar{B}_4 B_5 C \tag{10}$$

where:

$\bar{b}_5$ = the introduction of a triggering signal to the right input terminal in the flip-flop 74;

$B_5$ = a relatively high voltage on the left output terminal in the flip-flop 74; and The other terms have previously been defined.

The chart shown in Figure 6 represents the states of the flip-flops 66, 68, 70, 72 and 74 after the introduction of successive clock signals from the coil 86. The letter "L" represents a relatively high voltage on the left output terminal in the particular flip-flop and the letter "R" represents a relatively high voltage on the right output terminal in the flip-flop. As will be seen, the flip-flops 66, 68, 70, 72 and 74 assume a different pattern of operation upon the introduction of each successive triggering signal.

Since each different pattern of operation of the flip-flops 66, 68, 70, 72 and 74 represents a different number, the number "1" is represented by the pattern of operation which the flip-flops have before the introduction of any clock signals from the coil 86. This corresponds to a relatively high voltage on the left output terminals of each of the flip-flops. Successive counts are indicated in decimal form in the left column and the patterns of operation of the different flip-flops for these counts are indicated in successive columns to the right.

As will be seen in Figure 4, the right output terminals in the flip-flops 66 and 74 and the left output terminals in the flip-flops 68, 70 and 72 are connected to the cathodes of the diodes 178, 186, 180, 182 and 184, respectively. High voltages are simultaneously introduced from the flip-flops 66, 68, 70, 72 and 74 to the cathodes of the diodes 178, 180, 182, 184 and 186 only for a count of "18," as indicated by the chart shown in Figure 6. The simultaneous introduction of high voltages to the cathodes of the diodes 178, 180, 182, 184 and 186 limits the flow of current through the resistance 188. The resultant high voltage on the plate of the diode 189 causes a relatively large current to flow through the diode and the resistance 176 such that a relatively high voltage is produced across the resistance.

The high voltage produced across the resistance 176 is introduced through the line 82 to the plate of the diode 78. This voltage causes a relatively large current to flow through the diode 78 and the resistance 83 such that a considerable voltage is produced across the resistance. The high voltage across the resistance 83 is introduced to the cathode of the diode 80, which is in a logical "and" network with the diode 81. The positive voltage on the cathode of the diode 80 limits the flow of current through a circuit including the line 50, the resistance 85 and the diodes 80 and 81 until the induction of the next clock signal in the coil 86.

Upon the occurrence of the next clock signal, the voltage on the cathode of the diode 81 drops and a relatively large current flows through the resistance 85 and the diode 81. The resultant voltage drop across the resistance 85 produces a negative pulse of voltage which is differentiated to obtain a negative triggering signal. This signal is introduced to the left input terminal in the flip-flop 66 to trigger the flip-flop into its alternate state of operation, such that a high voltage is produced on the left output terminal of the flip-flop and a low voltage is produced on the right output terminal of the flip-flop.

In like manner, triggering signals pass to the left input terminals of the flip-flops 68, 70, 72 and 74 upon a count of "18" to produce relatively high voltages on the left output terminals of the flip-flops and relatively low voltages on the right output terminals of the flip-flops. In this way, the flip-flops are triggered into a pattern of operation corresponding to the integer "1," as indicated in the chart shown in Figure 6. This causes the flip-flops 66, 68, 70, 72 and 74 to initiate a new count from "1" to "18" every time that a full count of "18" has been reached.

The full logic controlling the passage of triggering signals to the left input terminal in the flip-flop 66 can now be logically expressed as $$b_1 = (\bar{B}_1 + P_{18}) C \tag{11}$$

where $P_{18}$ = a signal of high amplitude on the line 82 at pulse position "18" for each block; and The other terms have previously been defined.

In Equation 11 the "+" sign indicates an "or" network in which a signal passes when either one or the other of the terms is true. For example, current flows through the resistance 83 and produces a positive voltage across the resistance when a high voltage is applied to either the plate of the diode 76 or the plate of the diode 78.

In like manner, triggering signals pass to the left input terminals in the flip-flops 68, 70, 72 and 74 in accordance with the following logical expressions:

$$b_2 = (\bar{B}_1 \bar{B}_2 + P_{18}) C \tag{12}$$
$$b_3 = (\bar{B}_2 \bar{B}_3 + P_{18}) C \tag{13}$$
$$b_4 = (\bar{B}_3 \bar{B}_4 + P_{18}) C \tag{14}$$
$$b_5 = (\bar{B}_4 \bar{B}_5 + P_{18}) C \tag{15}$$

As will be seen from the chart shown in Figure 6, relatively high voltages are simultaneously produced on the left output terminals in the flip-flops 70, 72 and 74 only for a count between "1" and "4," inclusive. Thus, by connecting the left output terminals of the flip-flops 70, 72 and 74 to the cathodes of the diodes 160, 162 and 164, respectively, a high voltage is produced on the plates of the diodes only for a count between "1" and "4," inclusive. This high voltage produces a high voltage across the resistance 168 and on the output line 170.

For counts between "5" and "18," inclusive, at least one of the diodes 160, 162 and 164 has a low voltage applied to its cathode. This causes a relatively large current to flow through the resistance 166 so that a low voltage is produced on the plates of the diodes for introduction to the output line 170. This low voltage is inverted by the inverter 172 so that a high voltage is produced on the output line 174.

As previously disclosed, a high voltage is produced across the resistance 176 every time that a count of "18" has been attained. This voltage is introduced to the cathode of the diode 190, which is associated in a network with the diode 194. Since the cathode of the diode 194 receives signals from the left output terminal in the flip-flop 84, a triggering signal is produced on the plate of the diodes 190 and 194 every time that a clock signal is produced upon each count of "18." These signals trigger the counter 196, which is formed from a plurality of flip-flops interrelated by networks in a manner similar to the flip-flops 66, 68, 70, 72 and 74. In this way, the information in each of the channels such as the channel 100 in the magnetic drum 90 may be divided into a plurality of blocks each having a plurality of positions, such as 18 positions in this embodiment.

The members shown in Figure 4 and including the flip-flops 66, 68, 70, 72 and 74, the block counter 196, the magnetic drum 90 and the logical networks associated with these members may be included in suitable computing apparatus such as a digital differential analyzer. In a digital differential analyzer, the pulse positions in a plurality of channels corresponding to and including the channel 100 are divided into a plurality of blocks or integrators, each carrying information in a relatively small number of positions such as 18 positions. The blocks or integrators are interconnected so that the outputs from certain blocks are introduced to other blocks as increments in an independent quantity "$x$" and increments in a dependent quantity "$y$" for the integrators. Interconnections between integrators can be obtained since each integrator is identified by the operation of the block counter 196 and each pulse position in the integrator is identified by the operation of the flip-flops 66, 68, 70, 72 and 74 and their associated networks.

The digital differential analyzer operates to obtain the solution of differential problems. For example, it may provide the solution for a general equation $y=f(x)$ so as to obtain a function $\int y dx = \int f(x) dx$, where $f(x)$ represents a function and $\int f(x)dx$ represents the integral of the function. If a curve $y=f(x)$ is plotted with $x$ as the abscissa and $y$ as the ordinate, the analyzer obtains the relationship $\int y dx = \int f(x) dx$ by computing the area under the curve $y=f(x)$.

The analyzer obtains the value of the function $\int y dx = \int f(x) dx$ by producing small increments of $x$, such increments being designated as $\Delta x$. Every time that a $\Delta x$ increment is obtained for an integrator, the value of $y$ is combined with the value of $x$ to produce a $y\Delta x$ increment. By taking successive $y\Delta x$ increments for each integrator between values of $x_1$ and $x_2$, the value of $$\int_{x_1}^{x_2} f(x)dx$$

can be approximated. This approximation can be made quite accurate by minimizing the value of each $\Delta x$ increment. The cumulative value of the $y\Delta x$ increments for each integrator is stored in one of the channels of the magnetic drum 90 such as the channel 100.

The basic concepts of digital differential analysis are disclosed in "Fundamental Concepts of the Digital Differential Analyzer Method of Computation" written by R. E. Sprague for the January 1952 issue of Mathematical Tables and Other Aids to Computation and in "The Serial-Memory Digital Differential Analyzer" written by J. F. Donan for the April 1952 issue of the same publication.

The blocks in a digital differential analyzer can be used in various ways. One of the ways of using the integrators is as a servo in comparing two values. One of these values may be represented by the solution obtained by the digital differential analyzer to a particular differential problem, and the other value may be represented by a shaft position. Since the shaft position is an analogue quantity, it is first converted to a digital quantity having a plurality of positions. This may be effectuated by apparatus similar to that disclosed in co-pending application, Serial Number 467,154, filed November 5, 1954, by Leo P. Retzinger, Jr.

The digital quantity produced by a converter to represent an analogue quantity is then compared in the servo with the output quantity from the analyzer and an error representing the difference between the two quantities is obtained. The error is obtained by a block or blocks functioning as the servo and is digitally represented by signals in a plurality of positions for the output block in the servo. These signals may be magnetically introduced to the channel 100 by the coil 98 as the positions for the particular block move past the coil 98. The signals are subsequently induced in the coil 94 as the positions in the channel 100 move past the coil.

Since binary representation is being used, the signal in each position has either a high or a low amplitude. A signal having a high amplitude for a particular position indicates a value of "1" for the position and a signal having a low value for a particular position indicates a value of "0" for the position. For example, when a plurality of positions are used, signals may be produced in a pattern representing a digital value of 0100101, where the least significant digit is at the right. This digital quantity is equivalent to a value of $$(1)(2^0)+(0)(2^1)+(1)(2^2)+(0)(2^3)+(0)(2^4)+(1)(2^5)+(0)(2^6)$$

This is equivalent to a decimal value of "37."

When a signal having a high amplitude is induced in the coil 94, its negative trailing edge causes the flip-flop 209 (Figure 1) to be triggered into a state of operation in which a high voltage is produced on the left output terminal of the flip-flop and a low voltage is produced on the right output terminal of the flip-flop. Upon the induction in the coil 94 of a signal having a low amplitude, the inverter 210 operates to convert the signal into one having a high amplitude. The negative trailing edge of this inverted signal triggers the flip-flop 209 into its alternate state of operation. In this state of operation, a high voltage is produced on the right output terminal of the flip-flop 209 and a lower voltage is produced on the left output terminal of the flip-flop. In this way, the flip-flop is triggered into a pattern of operation in accordance with the pattern of signals appearing in the coil 94.

Just as the operation of the flip-flop 209 is controlled by signals from the coil 94, the operation of the flip-flop 203 is controlled by signals from the counters 196 and 200. When a particular block such as block "67" is reached, the counter 196 operates to produce a high voltage on the line 207. A high voltage is produced on the line 207 for a particular count in the block counter 196 in a manner similar to the production of a high voltage on the plates of the diodes 178, 180, 182, 184 and 186 for a count of "18" in the position counter shown in Figure 4. The simultaneous occurrence of a high voltage on the line 207 and a high voltage in the coil 86 prevents current from flowing through the resistance 208 and either of the diodes 205 and 206. This causes the voltage on the plates of the diodes 205 and 206 to become high. Upon the induction of the next clock signal in the coil 86, the voltage on the cathode of the diode 205 becomes low and current flows through the resistance 208 and the diode. The resultant negative pulse of voltage on the plates of the diodes 205 and 206 is differentiated in the flip-flop 203 to produce a negative triggering signal. This signal triggers the flip-flop 203 so that a high voltage is produced on the left output terminal and a low voltage is produced on the right output terminal.

The high voltage on the left output terminal of the flip-flop 203 continues until position "18" of the particular block such as block "67." At position "18," a high voltage is produced by the position counter 200 on the line 82, as previously disclosed in detail. Although the position counter 200 is shown in block form in Figure 1, its construction is shown in some detail in Figure 4 and its operation has been described fully above. This voltage causes a triggering signal to be produced on the plates of the diodes 201 and 202 upon the occurrence of the next clock signal in the coil 86. This triggering signal is produced by the diodes 201 and 202 in a manner similar to the production of the triggering signal by the diodes 205 and 206, as disclosed above. The signal triggers the flip-flop 203 into its alternate state of operation for the production of a high voltage on the right output terminal of the flip-flop and a low voltage on the left output terminal of the flip-flop. In this way, a high voltage is produced on the left output terminal of the flip-flop 203 only during positions "1" to "18" of the particular block such as block "67" which provides in the channel 100 the signal indications digitally representing the error resulting from the servo operation.

The voltages on the left output terminals of the flip-flops 203 and 209 are respectively introduced to the cathodes of the diodes 211 and 212. The diodes 211 and 212 form a network with the diode 213, the cathode of which receives the clock signals from the left output terminal in the flip-flop 84. This causes signals to pass through the network formed by the diodes 211, 212 and 213 only when high signals are induced in the coil 94 at the time that the particular block such as block "67" is presented for computation. These signals trigger the flip-flop 214 to produce a high voltage on the left output terminal in the flip-flop and a low voltage on the right output terminal in the flip-flop.

The passage of a triggering signal to the left input terminal of the flip-flop 214 can be logically expressed as $$e_4 = ESC \quad (16)$$

where:

$e_4$ = the introduction of a triggering signal to the left input terminal in the flip-flop 214;
$E$ = a relatively high voltage on the left output terminal of the flip-flop 209;
$S$ = a relatively high voltage on the left output terminal of the flip-flop 203; and
$C$ = a clock signal from the left output terminal in the flip-flop 84, as previously defined.

In like manner, triggering signals pass to the right input terminal in the flip-flop 214 when signals having a low amplitude are induced in the coil 94 for the particular block such as block "67." These signals trigger the flip-flop 214 to produce a high voltage on the right output terminal of the flip-flop and a low voltage on the left output terminal of the flip-flop. The logic controlling the passage of triggering signals to the right input terminal in the flip-flop 214 is $$\bar{e}_4 = \bar{E}SC \quad (17)$$

$\bar{e}_4$ = the introduction of a triggering signal to the right input terminal in the flip-flop 214;
$\bar{E}$ = a relatively high voltage on the right output terminal of the flip-flop 209; and
The other terms have previously been defined.

It will be seen from Equations 16 and 17 that during the presentation of the particular block for computation the flip-flop 214 is triggered in a pattern corresponding to the pattern of signals induced in the coil 94. During the first four positions for the particular integrator, the signals produced in the flip-flop 214 are introduced to the flip-flop 256 to produce a corresponding pattern of signals in the flip-flop 256. However, the signals appear in the flip-flop 256 one position after they appear in the flip-flop 214 since the flip-flop 256 can receive the indications from the flip-flop 214 only upon the induction of the next clock signal in the coil 86.

Transfer of the signal indications from the flip-flop 214 to the flip-flop 256 is initiated by the network formed by the diodes 240 and 242. High voltages are simultaneously introduced to the cathodes of the diodes 240 and 242 only when a high voltage is produced on the left output terminal of the flip-flop 214 at the time that a high voltage appears on the line 170 to indicate positions "1" to "4" inclusive, of each block. Such a simultaneous introduction of high voltages to the cathodes of the diodes 240 and 242 causes a high voltage to be produced on the plates of the diodes in a manner similar to that previously disclosed. This voltage produces a relatively large flow of current through the diode 244 and the resistance 246.

The positive potential produced across the resistance 246 upon the flow of current through the resistance is introduced to the cathode of the diode 250. During the presentation of the particular block for computation, a relatively high voltage is also introduced from the left output terminal in the flip-flop 203 to the cathode of the diode 254. This causes a negative pulse of voltage to be produced on the plates of the diodes 250, 252 and 254 upon the introduction of the next clock signal from the coil 86 to the cathode of the diode 252. The negative pulse of voltage is differentiated in the flip-flop 256 to produce a negative triggering signal. This signal in turn triggers the flip-flop 256 to produce a high voltage on the left output terminal in the flip-flop in a manner similar to the production of a high voltage on the left output terminal in the flip-flop 214 in the previous position.

A high voltage is produced on the right output terminal in the flip-flop 256 in a position between positions "1" and "4" of the particular block when a high voltage has been produced on the right output terminal in the flip-flop 214 in the previous position. This voltage is produced by the operation of the diodes 260 and 264, the diode 268 and the diodes 280, 282 and 284. These diodes operate in a manner similar to the diodes 240 and 242, the diode 244 and the diodes 250, 252 and 254, as disclosed above.

In like manner, the flip-flop 288 is triggered during positions "1" to "4" of the particular block into the state of operation of the flip-flop 256 in the previous position. This results in part from the operation of the diodes 290 and 292, the diode 296 and the diodes 302, 304 and 306 in controlling the signals passing to the left input terminal of the flip-flop 288. It also results in part from the operation of the diodes 310 and 312, the diode 316 and the diodes 324, 326 and 328 in controlling the signals passing to the right input terminal in the flip-flop. The flip-flop 330 is in turn triggered during positions "1" to "4" of the particular block into the state of operation of the flip-flop 288 in the previous position.

Because of the sequential transfer of information, the signals initially passing into the flip-flop at position "1" of the particular block are transferred into the flip-flop 330 at position "4" of the block. Similarly, the flip-flop 288 is triggered into a state of operation at position "4" of the particular block corresponding to the triggering of the flip-flop 214 at position "2" of the block. The flip-flops 256 and 214 also have states of operation respectively corresponding to the signal information in positions "3" and "4" of the particular block. In this way, the flip-flops 330, 288, 256 and 214 operate on a parallel basis at position "4" of the particular block corresponding to the signal indications serially induced in the coil 94 for these positions.

At position "5" for each block, the voltage on the line 170 becomes low. This voltage is inverted by the inverter 172 so that a high voltage is introduced from the inverter to the cathodes of the diodes 234 and 274. This voltage causes the networks formed by the diodes 230, 232 and 234 and by the diodes 262, 274 and 276 to become prepared for operation.

As will be seen in the chart shown in Figure 7, values between "0" and "+7," inclusive, are digitally represented by an indication of "0" in the 4th position. Because of the operation of the networks to convert the serial numbers in the first four pulse positions into parallel indications in the flip-flops 214, 256, 288 and 330, this indication of "0" in the 4th pulse position is indicated by a relatively high voltage on the right output terminal of the flip-flop 214 for position "4" of the particular block such as block "67." For values between "0" and "7," inclusive, the indications between position "5" and position "18" are all "0." If the value for the particular integrator is positive and is greater than "7," an indication of "1" appears at position "4" or one of the following pulse positions.

The network formed by the diodes 230, 232 and 234 indicates whether or not the signal indications in the channel 100 for the particular integrator represent a value greater than "+7." The network provides such a determination by producing a triggering signal when signal indications representing a value of "1" for a particular position are followed by signal indications representing a value of "0" for the following position. Such a triggering signal can only be produced after position "5" of the particular block for reasons which will be disclosed in detail hereinafter. For example, for a value of "8," an indication of "1" in position "4" is followed by an indication of "0" in position 5. This is indicated by the chart shown in Figure 7. Similarly for a value of "+208" signal indications representing a value of "1" in position "5" are followed by signal indications representing a value of "0" in position "6" and signal indications representing a value of "1" in position "8" are followed by signal indications representing a value of "0" in position "9."

The successive indications of "1" and "0" in a sequential pattern for two pulse positions are provided by the flip-flops 209 and 214. The flip-flop 209 first receives an indication representing a value of "1" from the coil 94 in the first position. Because of this indication, a relatively high voltage is produced on the left output terminal in the flip-flop 209. At the next position, this relatively high voltage is transferred to the flip-flop 214 such that a relatively high voltage is produced on the left output terminal of the flip-flop 214.

At the same time that a high voltage is being produced on the left output terminal in the flip-flop 214, an indication of "0" in the coil 94 is inverted by the inverter 210 and is introduced to the right input terminal in the flip-flop 209 to trigger the flip-flop into its alternate state of operation. This causes a relatively high voltage to be produced on the right output terminal of the flip-flop 209. The simultaneous occurrence of relatively high voltages on the right output terminal in the flip-flop 209 and the left output terminal in the flip-flop 214 prepares the network formed by the diodes 230, 232 and 234 to become operative. The network becomes operative provided that a relatively high voltage is introduced to the cathode of the diode 234 from the inverter 172 to indicate that pulse positions "5" to "18," inclusive, are being presented for computation.

When relatively high voltages are simultaneously introduced to the cathodes of the diodes 230, 232 and 234, only a limited current is able to flow through the resistance 236. This causes the voltage on the plates of the diodes 230, 232 and 234 to become relatively high. The relatively high voltage is introduced to the plate of the diode 248 to produce a relatively large flow of current through the diode 248 and the resistance 246, such that a high voltage is produced across the resistance. This high voltage is introduced to the cathode of the diode 250 which forms a network with the diodes 252 and 254.

Since the cathode of the diode 254 is connected to the left output terminal in the flip-flop 203, the network formed by the diodes 250, 252 and 254 can become operative only when the particular block such as block "67" is presented for computation. When the particular block is presented for computation, a signal passes through the network formed by the diodes 250, 252 and 254 upon the induction of the next clock signal in the coil 86. This signal passes to the left input terminal in the flip-flop 256 to trigger the flip-flop into a state of operation for producing a relatively high voltage on the left output terminal of the flip-flop.

The voltage on the plates of the diodes 230, 232 and 234 is not only introduced to the plate of the diode 248 but also to the plates of the diodes 298 and 340. This causes a relatively large current to flow through the diode 298 and the resistance 300 and through the diode 340 and the resistance 342 when a relatively high voltage is produced on the plates of the diodes 230, 232 and 234. The resultant high voltages produced across the resistances 300 and 342 respectively prepare the networks formed by the diodes 302, 304 and 306 and by the diodes 344, 346 and 348 for operation. Upon the occurrence of the next clock signal during the presentation of the particular integrator for computation, triggering signals pass to the left input terminals in the flip-flops 288 and 330. These signals trigger the flip-flops 288 and 330 into states of operation for the production of relatively high voltages on the left output terminals of the flip-flops.

It will be seen from the above discussion that the flip-flops 256, 288 and 330 become triggered to produce relatively high voltages on their left output terminals when values greater than "+7" are presented in the channel 100 for the particular integrator. For positive values, the flip-flop 214 becomes triggered at position "18" so that a relatively high voltage is produced on its right output terminal. This may be seen from the chart shown in Figure 7 since a value of "0" at position 18 is intended to indicate a positive value. Respective indications of "0111" by the flip-flops 214, 256, 288 and 330 correspond to a value of "7." In this way, the flip-flops 214, 256, 288 and 330 and their logical networks operate to convert positive values greater than "+7" into values of "+7." This may be seen by the horizontal line 570 in the response curve shown in Figure 8. This is desirable in servo operations since a value such as "+7" is the maximum value to which the servo can respond satisfactorily without excessive hunting.

In like manner, the flip-flops 214, 256, 288 and 330 and their associated networks operate to convert negative values having magnitudes greater than "—8" into values of "—8." The flip-flops operate to produce this conversion by detecting when signal indications representing a value of "0" in position "4" or any of the following positions are followed by signal indications representing a value of "1" in the successive position. For example, for a value of "—9" signal indications representing value of "0" in position "4" are followed by signal indications representing a value of "1" in position "5." Similarly, for a value of "—510" signal indications representing a value of "0" in position "9" are followed by signal indications representing a value of "1" in position "10."

When indications representing successive values of "0" and "1" occur to show negative values having absolute magnitudes greater than "8," relatively high voltages are simultaneously produced on the right output terminal in the flip-flop 214 and the left output terminal in the flip-flop 209. The simultaneous occurrence of such high voltages causes the network formed by the diodes 262, 274 and 276 to become operative. The network becomes operative provided that a relatively high voltage is simultaneously introduced to the cathode of the diode 274 from the inverter 172 to indicate the presentation of positions "5" to "18," inclusive, for computation. The simultaneous occurrence of high voltages on the cathodes of the diodes 262, 274 and 276 causes a high voltage to be produced on the plates of the diodes. This high voltage causes a relatively large current to flow through the diode 270 and the resistance 272 such that a high voltage is produced across the resistance.

The high voltage across the resistance 272 is introduced to the cathode of the diode 280, which forms a network with the diodes 282 and 284. The network then passes a triggering signal when the particular block such as block "67" is presented for computation. This signal is introduced to the right input terminal in the flip-flop 256 to trigger the flip-flop into a state of operation for the production of a high voltage on the right output terminal. Similarly, high voltages are produced across the resistances 320 and 370 by the high voltage on the plates of the diodes 262, 274 and 276. The high voltages across the resistances 320 and 370 cause triggering signals to pass through the networks formed by the diodes 324, 326 and 328 and the diodes 362, 364 and 366 upon the presentation of the particular block for computation. These signals trigger the flip-flops 288 and 330 to produce high voltages on the right output terminals of the flip-flops.

Figure 8:
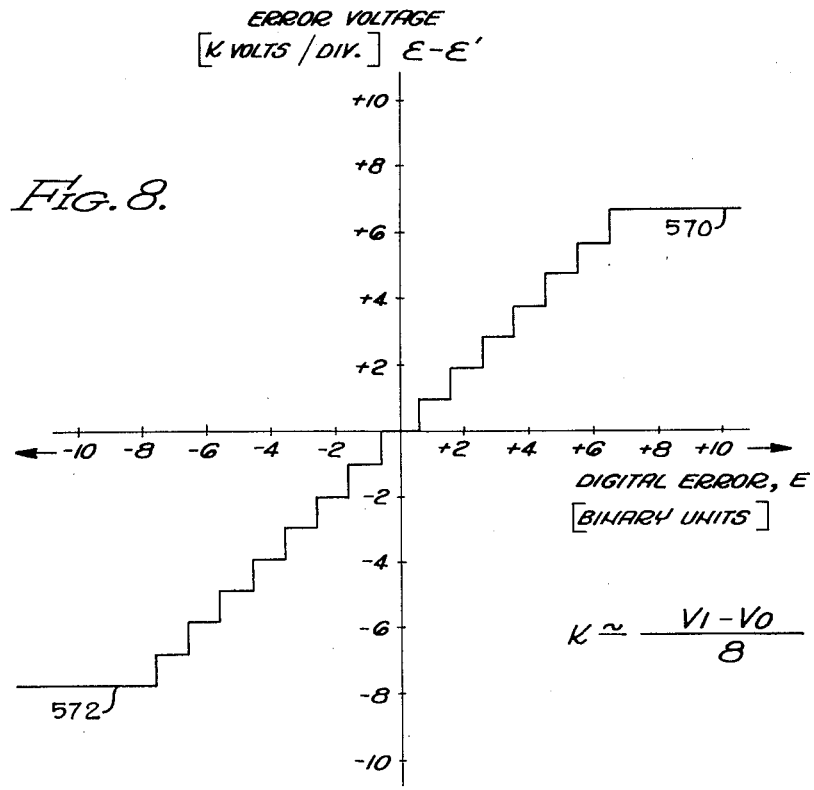
Figure 8 is a chart illustrating the operation of the circuits shown in Figure 4.

As may be seen in Figure 7, negative values in the channel 100 for the particular block are indicated by a value of "1" at position "18." This indication causes a relatively high voltage to be produced on the right output terminal of the flip-flop 214 at position "18." In this way, the flip-flops 214, 256, 288 and 330 respectively provide indications of "1000" for negative values having absolute magnitudes equal to or greater than "8." This may be seen by the horizontal line 572 in the response curve shown in Figure 8. Negative values having absolute magnitudes greater than "8" are converted to values of "—8" to produce an optimum operation of the servo controlled by the indications in the flip-flops 214, 256, 288 and 330.

The passage of triggering signal to the left tube in the flip-flop 256 can be logically expressed as $$e_3 = (E_4 P_{1/4} + \bar{E} E_4 P_{5/18}) SC \qquad (18)$$

where:

$e_3$ = the introduction of a triggering signal to the left input terminal in the flip-flop 256;
$E_4$ = a relatively high voltage on the left output terminal in the flip-flop 214;
$P_{1/4}$ = a relatively high voltage on the line 170 to indicate the presentation of positions "1" to "4," inclusive in each block for computation;
$\bar{E}$ = a relatively high voltage on the right output terminal in the flip-flop 209;
$P_{5/18}$ = a relatively high voltage from the inverter 172 to indicate the occurrence of positions "5" to "18," inclusive, for each block;
$S$ = a relatively high voltage on the left output terminal in the flip-flop 203 to indicate the presentation of the particular block such as block "67" for computation; and
$C$ = a clock signal from the left output terminal in the flip-flop 84.

Triggering signals pass to the right input terminal in the flip-flop 256 in accordance with the logical equation $$\bar{e}_3 = (\bar{E}_4 P_{1/4} + E \bar{E}_4 P_{5/18}) SC \qquad (19)$$

where:

$\bar{e}_3$ = the introduction of a triggering signal to the right input terminal in the flip-flop 256;
$\bar{E}_4$ = a relatively high voltage on the right output terminal in the flip-flop 214;
$E$ = a relatively high voltage on the left output terminal in the flip-flop 209; and
The other terms have previously been defined.

The left input terminal in the flip-flop 288 receives triggering signals in accordance with the logical equation $$e_2 = (E_3 P_{1/4} + \bar{E} E_4 P_{5/18}) SC \qquad (20)$$

where:

$e_2$ = the introduction of a triggering signal to the left input terminal in the flip-flop 288;
$E_3$ = a relatively high voltage on the left output terminal in the flip-flop 256; and
The other terms have previously been defined.

Similarly, signals are introduced to the right input terminal in the flip-flop 288 in accordance with the logical equation $$\bar{e}_2 = {}_1\bar{E}_3 P_{1/4} + E \bar{E}_4 P_{5/18}) SC \qquad (21)$$

where:

$\bar{e}_2$ = the introduction of a triggering signal to the right input terminal in the flip-flop 288;
$\bar{E}_3$ = a relatively high voltage on the right input terminal in the flip-flop 256; and
The other terms have previously been defined.

The triggering of the flip-flop 330 is controlled by triggering signals which are produced in accordance with the logical equations $$e_1 = (E_2 P_{1/4} + \bar{E} E_4 P_{5/18}) SC \qquad (22)$$
$$\bar{e}_1 = \bar{E}_2 P_{1/4} + E \bar{E}_4 P_{518}) SC \qquad (23)$$

$e_1$ = the introduction of a triggering signal to the left input terminal in the flip-flop 330;
$E_2$ = a relatively high voltage on the left output terminal of the flip-flop 288;
$\bar{e}_2$ = the introduction of a triggering signal to the right input terminal in the flip-flop 330;
$\bar{E}_2$ = a relatively high voltage on the right output terminal in the flip-flop 288; and
The other terms have previously been defined.

The voltages produced on the output terminals of the flip-flops 214, 256, 288 and 310 are utilized in the balanced weighting network shown in Figure 2. As previously disclosed, the different impedances in the network such as the resistances 376, 378 410, 412 430 432, 440 and 442 are provided with particular values. Because of the particular values chosen for these resistances, the voltages produced by the flip-flops 330, 288, 256 and 214 contribute different amounts to the output voltages introduced to the grids of the tubes 460 and 466. This may be seen from an analysis of the network on the basis of network theorems and Kirchhoff's laws.

Figure 9:
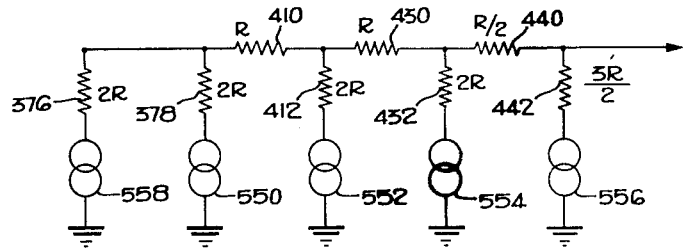
Figure 9 is a simplified schematic diagram of part of the circuit shown in Figure 2.

In Figure 9, the voltages from the flip-flops 330, 288, 256 and 214 are respectively illustrated in figurative form as signal sources 550, 552, 554 and 556 and the voltage on the line 382 is figuratively illustrated as a signal source 558. In Figure 9, only the contributions made to the voltage introduced to the grid of the tube 460 are considered. The resistances 380, 414, 434 and 444 are not included in the simplified circuit shown in Figure 9, since they have values considerably less than the other resistances and since they perform other functions which will be disclosed in detail hereinafter. Although only the production of the voltage on the grid of the tube 460 is considered in the discussion below, it is believed that a person skilled in the art would understand from the discussion how the voltage on the grid of the tube 466 is produced.

If the signal source 556 in Figure 9 is considered as providing a zero voltage, the resistances 442 and 440 would be in series with each other and in parallel with the resistance 432. Because of the values provided for the different resistances, the combined value of the resistances 440 and 442 would be substantially equal to the value of the resistance 432. This causes one half of the voltage produced by the signal source 554 to appear across the resistance 432 and the other half to appear across the resistances 440 and 442. In this way, the voltage produced by the flip-flop 256 in Figure 2 has substantially half the weight as the voltage from the flip-flop 214 in determining the voltage introduced to the grid of the tube 460. This corresponds to the relative digital importance of the signal indications in the flip-flops 214 and 256.

In like manner, if the signal sources 554 and 556 in Figure 9 are considered to produce zero voltages, the resistances 432, 440 and 442 would have an equivalent resistance of R, where the values of these resistances are respectively 2R, R/2 and 3R/2. This equivalent value of R is in series with the resistance 430 also having a value of R. The resistance 430 and the equivalent resistance are in turn in parallel with the resistance 412, which has a value of 2R. This causes one half of the voltage from the signal source 552 to be produced across the resistance 412 and the other half across the resistances 430, 432, 440 and 442. One half of the voltage produced across the resistances 430, 432, 440 and 442 is in turn produced across the resistance 430 and the other half across the equivalent resistance of R. In this way, the flip-flop 288 provides substantially one fourth as much contribution as the voltage from the flip-flop 214 to the voltage introduced to the grid of the tube 460. This is in accordance with the relative digital importance of the indications provided by the flip-flops 214 and 288, which respectively indicate $2^3=8$ and $2^1=2$.

It can also be shown that the contribution provided to the voltage on the grid of the tube 460 from the flip-flop 330 is substantially one eighth as great as the voltage from the flip-flop 214. This corresponds to the relative digital importance of the flip-flops 218 and 330, since the flip-flop 330 indicates the digit representing $2^0=1$, and the flip-flop 214 indicates the digit representing $2^3=8$. The contribution provided by the voltage on the line 382 has substantially the same weight as the voltage from the flip-flop 330 since the resistances 376 and 378 have substantially the same value.

On the basis of the above disclosure, the voltage introduced to the grid of the tube 460 can be represented as $$\epsilon = \tfrac{1}{2}\left(\overline{E}_4 + \frac{E_3}{2} + \frac{E_2}{4} + \frac{E_1}{8} + \frac{V_0}{8}\right) \quad (23)$$

where:

$\epsilon$ = the voltage introduced to the grid of the tube 460;
$V_0$ = the voltage produced on the line 382, the voltage preferably having a value such as +10 volts; and
The other terms have previously been defined.

The term $\overline{E}$ is included in the above equation instead of E, since the voltage on the left output terminal of the flip-flop 214 contributes to the potential on the grid of the tube 460, whereas the voltages on the right output terminals of the flip-flops 256, 288 and 330 contribute to the potential on the grid of the tube.

In like manner, the voltage introduced to the grid of the tube 466 can be expressed as $$\epsilon' = \tfrac{1}{2}\left(\overline{E}_4 + \frac{\overline{E}_3}{2} + \frac{\overline{E}_2}{4} + \frac{\overline{E}_1}{8} + \frac{V_1}{8}\right) \quad (24)$$

where:

$\epsilon'$ = the voltage introduced to the grid of the tube 466;
$V_1$ = the voltage on the line 388, this voltage preferably having a value such as +30 volts; and
The other terms have previously been defined.

For a value such as "+5," the left output terminals in the flip-flops 330 and 258 and the right output terminals in the flip-flops 288 and 214 have high voltages. This corresponds to a digital pattern of 1010, where the least significant digit is at the left. As may be seen by the chart shown in Figure 7, such a pattern represents the value "+5" in digital form. This causes $$E_1 = \overline{E}_2 = E_3 = \overline{E}_4 = V_1$$

since all of these voltages are high. Similarly, $$\overline{E}_1 = E_2 = \overline{E}_3 = E_4 = V_0$$

since all of these voltages are low. Substituting these values into Equations 23 and 24, $$\epsilon = \tfrac{1}{2}\left(V_1 + \frac{V_1}{2} + \frac{V_0}{4} + \frac{V_1}{8} + \frac{V_0}{8}\right) = \tfrac{1}{2}\left(\frac{13V_1}{8} + \frac{3V_0}{8}\right) \quad (25)$$

$$\epsilon' = \tfrac{1}{2}\left(V_0 + \frac{V_0}{2} + \frac{V_1}{4} + \frac{V_0}{8} + \frac{V_1}{8}\right) = \tfrac{1}{2}\left(\frac{13V_0}{8} + \frac{3V_1}{8}\right) \quad (26)$$

Therefore, $$\epsilon - \epsilon' = \tfrac{1}{2}\left(\frac{13V_1}{8} + \frac{3V_0}{8}\right) - \tfrac{1}{2}\left(\frac{3V_1}{8} + \frac{13V_0}{8}\right) = \tfrac{5}{8}(V_1 - V_0) \quad (27)$$

As will be seen, the value of "5" in the numerator of Equation 27 represents in analogue form the digital indications provided by the flip-flops 214, 256, 288 and 330.

Similarly, a negative value of "−3" is represented by a digital pattern of 1011, where the least significant digit is at the left. This may be seen in the chart shown in Figure 7. This causes high voltages to be produced on the left output terminals in the flip-flops 330, 256 and 214 and on the right output terminal in the flip-flop 288. Because of this, $E_1 = \overline{E}_2 = E_3 = E_4 = V_1$ since all of these voltages are high. Similarly, $\overline{E}_1 = E_2 = \overline{E}_3 = \overline{E}_4 = V_0$, since all of these voltages are low. Substituting these values in Equations 23 and 24, $$\epsilon = \tfrac{1}{2}\left(V_0 + \frac{V_1}{2} + \frac{V_0}{4} + \frac{V_1}{8} + \frac{V_0}{8}\right) = \tfrac{1}{2}\left(\frac{5V_1}{8} + \frac{11V_0}{8}\right) \quad (28)$$

$$\epsilon' = \tfrac{1}{2}\left(V_1 + \frac{V_0}{2} + \frac{V_1}{4} + \frac{V_0}{8} + \frac{V_1}{8}\right) = \tfrac{1}{2}\left(\frac{11V_1}{8} + \frac{5V_0}{8}\right) \quad (29)$$

$$\epsilon - \epsilon' = \tfrac{1}{2}\left(\frac{5V_1}{8} + \frac{11V_0}{8}\right) - \tfrac{1}{2}\left(\frac{11V_1}{8} + \frac{5V_0}{8}\right) = -\frac{3}{8}(V_1 - V_0) \quad (30)$$

In like manner, it can be shown that $$\epsilon - \epsilon' = \frac{K}{8}(V_1 - V_0) \quad (31)$$

where $K$ = an integer in the range $-8 \leq K \leq +7$ and represents the value of the analogue quantity to be converted from the digital indications provided by the flip-flops 214, 256, 288 and 330.

Since the weighting network is balanced, it operates on a push-pull basis to obtain the difference between a pair of output voltages. By operating the network on a push-pull basis, errors resulting from changes in such parameters as the voltages on the lines 382 and 388 are minimized. This results from the fact that the same errors are produced in the voltage $\epsilon'$ on the grid of the tube 466 as the voltage $\epsilon$ on the grid of the tube 460. These errors are then substantially eliminated by taking the difference $\epsilon - \epsilon'$ in the voltages.

Each of the flip-flops 214, 256, 288 and 330 is able to provide output voltages only between the ranges of +10 and +30 volts. This results from the operation of the diodes corresponding to the diodes 384 and 386 and the diodes 396 and 398 associated with the flip-flop 330. It also results from the operation of the power supply 20 in applying regulated potentials of substantially +30 and +10 volts to the lines 382 and 388, respectively. For example, current flows through the resistance 380 and the diode 386 when the potential on the right output terminal in the flip-flop 330 causes the voltage on the common terminal between the resistances 378 and 380 to exceed +30 volts. This current causes the potential on the common terminal between the resistances 378 and 380 to return to +30 volts. Similarly, current flows through the diode 384 and the resistance 380 when the potential on the common terminal between the resistances 378 and 380 is less than +10 volts. The current raises the potential on the common terminal between the resistances 378 and 380 to +10 volts. By maintaining the potential between +10 and +30 volts, increased accuracy is obtained in the difference in voltage introduced to the grids of the tubes 460 and 466.

The voltage introduced to the grid of the diode 460 produces a corresponding flow of current through the diode 460 and the resistance 464 and a proportionate voltage across the resistance. At the same time, the impedance presented to the voltage across the resistance 464 is considerably less than that of the input voltage because of the relatively low value of the resistance. This results from the operation of the diode 460 and the resistance 464 as a cathode follower stage. In like manner, a voltage proportionate to the voltage introduced to the grid of the tube 466 is produced across the resistance 470. In this way, the difference in the voltage on the output lines 462 and 468 represents $\epsilon - \epsilon'$.

The voltages produced on the lines 462 and 468 are introduced to the diode bridges 486 and 514, respectively, in Figure 3. The voltages on the output terminals of the flip-flop 203 are also introduced to the diode bridges 486 and 514. During the presentation of the particular block such as "67" for computation, the left output terminal of the flip-flop 203 has a high potential such as +40 volts and the right output terminal of the flip-flop has a low potential such as 0 volt. These voltages are produced in accordance with the operation of the logical networks shown in Figure 1 and disclosed above.

The potential of 0 volt on the right output terminal in the flip-flop 203 is introduced to the cathode of the diode 488. This causes current to flow through the resistance 492 and the diode 488 so that the potential on the plate of the diode becomes approximately 0 volt. Current also flows through the diode 494 and the resistance 496 to make the potential on the cathode of the diode 494 correspond substantially to the potential of +40 volts on the left output terminal of the flip-flop 203.

For reasons which will be disclosed in detail hereinafter, the potential across the capacitance 502 can vary only between +10 and +30 volts. This causes the potential on the cathode of the diode 490 to be greater than the potential of 0 volt on the plate of the diode and prevents current from flowing through the diode to charge the capacitance 502. Similarly, the potential on the plate of the diode 500 is less than the potential of +40 volts on the cathode of the diode such that current cannot flow from the capacitance 502 through the diode 500 to discharge the capacitance. In this way, the capacitance 502 cannot discharge through the bridge 486 during the presentation of the particular block for computation.

During the presentation of the particular block for computation, the potential of 0 volt on the right output terminal of the flip-flop 203 is also introduced to the cathode of the diode 516. The resultant flow of current through the resistance 520 and the diode 516 causes the plate of the diode to assume a potential substantially equal to 0 volt. At the same time, the voltage on the cathode of the diode 522 becomes substantially +40 volts because of the potential on the left output terminal of the flip-flop 203 and the flow of current through the diode 522 and the resistance 526.

The potential across the capacitance 528 varies between +10 and +30 volts for the same reasons as the potential across the capacitance 502. This prevents the flow of current through the diode 518 and the capacitance 528 to charge the capacitance since the voltage on the cathode of the diode is greater than the potential of 0 volt on the plate of the diode. It also prevents current from flowing through the capacitance 528 and the diode 524 to discharge the diode since the potential on the plate of the diode is less than the potential of +40 volts on the cathode of the diode. In this way, the capacitance 528 cannot discharge through the bridge 514 during the presentation of the particular block for computation.

At pulse position "18" of the particular block, the flip-flop 203 is triggered in a manner previously disclosed in detail to produce a high voltage on the right output terminal in the flip-flop 203 and a low voltage on the left output terminal in the flip-flop. This causes a potential of +40 volts to be introduced to the cathode of the diode 488. At the same time, a potential between +10 and +30 volts is introduced to the cathode of the diode 482 from the line 462. As previously disclosed, the particular potential produced on the line 462 is dependent upon the error signal $\epsilon - \epsilon'$. Since the potential on the cathode of the diode 482 is less than the potential on the cathode of the diode 488, the flow of current through the resistance 492 and the diodes causes the voltage on the plates of the diodes 482 and 488 to become substantially equal to that on the cathode of the diode 482.

The potential of 0 volt produced on the left output terminal of the flip-flop 203 is introduced to the plate of the diode 494. Since a potential between +10 and +30 volts is introduced to the plate of the diode 484 from the line 462, the voltage on the plate of the diode 484 controls. The resultant flow of current through the diode 484 and the resistance 496 causes the voltage on the cathodes of the diodes 484, 494 and 500 to be substantially equal to the voltage on the plate of the diode 484.

As will be seen, the voltage on the cathodes of the diodes 484, 494 and 500 is substantially equal to the voltage on the plates of the diodes 482, 488 and 490. If this voltage is greater than the potential across the capacitance 502, current flows through the diode 490 and the capacitance 502 to charge the capacitance. If the voltage on the cathode of the diode 500 is less than that across the capacitance, current flows through the capacitance 502 and the diode 500 to discharge the capacitance. In this way, the voltage across the capacitance 502 becomes substantially equal to the voltage on the line 462.

The potential of +40 volts on the right output terminal in the flip-flop 203 is also introduced to the cathode of the diode 516, and the potential on the line 468 is introduced to the cathode of the diode 510. Since the voltage on the cathode of the diode 510 is less than that on the cathode of the diode 516, the voltage on the cathode of the diode 510 controls and the potential on the plates of the diodes 510, 516 and 518 attains a value between +10 and +30 volts. The potential on the cathodes of the diodes 512, 522 and 524 reaches the same voltage since the voltage on the plate of the diode 512 is greater than the voltage on the plate of the diode 522. When the voltage across the capacitance 528 is less than the voltage on the plates of the diodes 510, 516 and 518, current flows through the diode 518 and the capacitance to charge the capacitance. For voltages across the capacitance 528 greater than the voltage on the cathodes of the diodes 512, 522 and 524, current flows from the capacitance 528 through the diode 524 to discharge the capacitance. This causes the voltage across the capacitance 528 to become substantially equal to the voltage on the line 468.

Since the voltages across the capacitances 502 and 528 are substantially equal to the voltages on the lines 462 and 468, the difference in the voltages across the capacitances is substantially equal to $\epsilon - \epsilon'$. This difference in voltage is applied to the grids of the tubes 504 and 530, which are included in cathode follower stages. This causes a difference in voltages equal to $\epsilon - \epsilon'$ to be produced on the output lines 506 and 532. The difference in the voltages on the lines 506 and 532 is applied to the amplifiers 540. The signals from the amplifiers 540 are then introduced to the servomotor 542 to produce a corresponding operation of the motor. The motor 542 drives a shaft or other suitable output member in a direction to reduce the magnitude of the error signals produced in the channel 100 for the particular block such as the block "67."

The apparatus disclosed above has several important advantages. It converts a digital quantity within certain limits into a corresponding analogue quantity. For example, it converts digital values between "0" and "+7" into corresponding voltages and it converts values between "0" and "—8" into corresponding voltages. For positive digital values greater than "+7," voltages representing a value of "+7" are produced for subsequent utilization. For digital values having a negative value exceeding "—8," voltages representing a value of "—8" are produced. This is especially desirable when the converter is to be utilized in a servo operation.

The apparatus disclosed above has other advantages as well. By utilizing a balanced weighting network such as shown in Figure 2, enhanced accuracies are obtained in the analogue signal representative of the digital quantity. The enhanced accuracy in the analogue quantity reresuls from the elimination of possible errors in such parameters as supply voltages.

The use of the storage circuit shown in Figure 3 also provides advantages in the operation of the digital-to-analogue converter constituting this invention. This results in part from the utilization of diode bridges each of which is in a balanced operation within itself and each of which is in a balanced operation with the other bridge. By including a pair of diode bridges in the storage circuit, the capacitances such as the capacitances 502 and 528 are not able to discharge through any of the prior stages which control the charge in the capacitances. In this way, the full charges in the capacitances are available to be used in the subsequent stages such as for producing an operation of the servo motor 542.

I claim:

1. In combination, means for providing signal indications representing an information value in digital form and for sequentially presenting the signal indications for computation, a plurality of bistable members having first and second output terminals, means including the bistable members for converting the sequential signal indications into corresponding signal indications in parallel form, and means including the first output terminals in particular ones of the bistable members and second output terminals in the other bistable members for providing a first output potential, means including the second output terminals in the particular bistable members and the first output terminals in the other bistable members for providing a second output potential, and means for obtaining the difference between the first and second output potentials to obtain a resultant potential representing the information value in analogue form.

2. In combination, means for providing signal indications representing an information value in digital form and for sequentially presenting the signal indications for computation, means including a plurality of bistable members connected in a particular balanced network and responsive to the sequential signals for converting sequential signal indications into corresponding signal indications in parallel form, an impedance network including the parallel converting means coupled to the signal means for converting the signal indications into a corresponding electrical voltage, and means including a diode bridge coupled to the impedance network and a reactance member coupled to the diode bridge for storing in the reactance member an amount of energy substantially proportionate to the electrical voltage for use at particular times and without leakage of the energy through the diode bridge at the other times.

3. In combination, means for providing signal indications representing an information value in digital form, means for sequentially presenting the signal indications for computation, means for converting the sequential signal indications into corresponding signal indications in parallel form, a balanced weighting network including the parallel converting means for converting the signal indications in the parallel means into a pair of voltages having a difference corresponding to the value represented by the signal indications, and means including a pair of diode bridges and a pair of capacitances connected across the bridges for charging the capacitances to voltages having a difference corresponding to the difference in the voltages from the balanced weighting network at particular periods of time and for preventing any discharge of the capacitances through the diode bridges during the other periods of time to maintain the charges in the capacitances substantially constant during these periods of time.

4. In combination, means for providing a plurality of signals representing a number in digital form, means for presenting successive signals in the plurality for computation, a plurality of bistable members having first and second output terminals and operative in accordance with the presentation of successive signals in the plurality to be triggered in a particular pattern, a voltage source having first and second output voltages, means including the first output voltage from the voltage source and the first output terminals in particular ones of the bistable members and the second output terminals in the other bistable members for providing a first output potential, means including the second output voltage from the voltage source and the second output terminals in the particular bistable members and the first output terminals in the other bistable members for providing a second output potential, and means for obtaining the difference between the first and second output potentials to obtain a resultant potential representing the number in analogue form.

5. In combination, means for providing a plurality of positions, means for providing in successive positions in the plurality signal indications digitally representing an error value, means for presenting successive positions in the plurality for computation, a plurality of bistable members having first and second stages of operation, means having first and second terminals for providing first and second voltages, means including a first plurality of resistances connected in a weighting network with the first stages of particular bistable members in the plurality and the second stages of the other bistable members in the plurality and with the first terminal of the voltage source to provide a first output voltage in accordance with the weighting effects of the signal indications introduced to the different bistable members, means including a second plurality of resistances connected in a weighting network with the second stages of the particular bistable members in the plurality and the first stages of the other bistable members and with the second terminal of the voltage source to provide a second output voltage in accordance with the weighting effects of the signal indications introduced to the different bistable members, and means for obtaining the difference between the first and second output voltages to obtain a resultant voltage representing the error value in analogue form.

6. In combination, means for providing in a plurality of positions signal indications digitally representing an information value, a plurality of bistable members associated with the signal-indicating means for triggering in a pattern dependent upon the pattern of the signal indications, a balanced weighting network including the bistable members and a plurality of impedances and a pair of output terminals for converting the signal indications provided by the bistable members into a corresponding voltage difference between the output terminals, a storage circuit including a pair of diode bridges and a pair of reactance members for storing in the members a difference in energy corresponding to the difference in voltage between the output terminals in the weighting network, and means associated with the storage circuit for producing changes in the energy stored in the circuit only at particular times and for preventing any transfer of energy between the reactance members and the diode bridges at the other times.

7. In combination, means for providing in a plurality of positions signal indications digitally representing an information value, a plurality of bistable members, means including a plurality of logical networks for transferring into the bistable members the signal indications in the positions of least significance for information values between particular values and for transferring into the bistable members signal indications representing the particular limits for information values outside of the particular values, and means including the bistable members for converting the signal indications in the bistable members to a corresponding voltage level.

8. In combination, means for providing in a plurality of positions signal indications digitally representing an information value, means including a plurality of bistable members and a plurality of logical "and" and "or" networks associated with the signal-indicating means for triggering the bistable members in a pattern corresponding to the signal indications of least significance for information values having an absolute magnitude within a particular value and for triggering the bistable members in a pattern corresponding to the particular value for information values having an absolute magnitude greater than the particular value, and a balanced weighting network including the bistable members and a plurality of impedances having weighted values for converting the signal indications in the bistable members into a pair of output voltages having a difference corresponding to the pattern of triggering of the bistable members.

9. In combination, means for providing in a plurality of positions signal indications digitally representing an information value, a plurality of bistable members associated with the signal-indicating means for triggering in a pattern corresponding to the signal indications of least significance for information values having an absolute magnitude within a particular value and for triggering in a pattern corresponding to the particular value for information values having an absolute magnitude greater than the particular value, a balanced weighting network including the bistable members and a plurality of impedances for converting the signal indications in the bistable members into a pair of output voltages having a difference corresponding to the pattern of triggering of the bistable members, and a balanced storage circuit including a pair of diode bridges for storing the output voltages.

10. In combination, means for providing a plurality of signals representing an information value in digital form, a plurality of bistable members, the bistable members being smaller in number than the signals in the plurality, means for sampling the signals in the plurality to produce a triggering of the bistable members into a corresponding pattern upon the occurrence of signals representing an information value between particular limits and to produce a triggering of the bistable members into a pattern representing one of the particular limits upon the occurrence of signals representing an information value outside of the particular limits, an impedance network including the bistable members for converting the pattern of operation of the bistable members into a corresponding output voltage, and means for providing for a storage of energy corresponding to the output voltage and for providing for an adjustment in the amount of stored energy at particular times in accordance with changes in the output voltage and for preventing any adjustment in the amount of the stored energy at the other times.

11. In combination, a capacitance, means for providing a voltage having a variable amplitude to represent different information, a diode bridge connected between the voltage means and the capacitance to control the charge produced across the capacitance in accordance with the voltage from the voltage means, and a bistable member having first and second states of operation, the bistable member being connected to the diode bridge to prevent the flow of current between the capacitance and the voltage means during the operation of the bistable member in its first state and to provide for a controlled variation of the charge across the capacitance upon an operation of the bistable member in its second state and in accordance with the voltage from the voltage means.

12. In combination, a bridge formed from a plurality of diodes and having first, second, third and fourth terminals common to different diodes in the plurality, means for introducing to the first terminal in the diode bridge a voltage having an amplitude representative of different information, a bistable member having first and second output terminals and operative in one state to produce a high voltage on the first output terminal and a low voltage on the second output terminal and in the other state to produce a high voltage on the second output terminal and a low voltage on the first output terminal, a capacitance connected to the second terminal in the bridge to become charged in accordance with the voltage from the voltage means, and means for introducing the voltage on the first and second output terminals in the bistable member to the third and fourth terminals in the diode bridge to prevent any transfer of energy between the capacitance and the diode bridge upon the operation of the bistable member in its first state and to provide for a proper charge in the capacitance upon the operation of the bistable member in its second state.

13. In combination, for converting into an analogue representation an information value indicated in digital form, a plurality of bistable members having first and second stages of operation, means for providing a plurality of signal indications representing the information value in digital form and for introducing the signal indications to the bistable members to trigger the members into corresponding states of operation, means including a first plurality of impedances having particular values relative to one another for connecting in a parallel arrangement the first stages of particular bistable members in the plurality and the second stages of the other bistable members in the plurality to provide a first output voltage dependent upon the information value, means including a second plurality of impedances having particular values relative to one another for connecting in a parallel arrangement the second stages of the particular bistable members and the first stages in the other bistable member to provide a second output voltage dependent upon the information value, and means for obtaining the difference between the first and second voltages to obtain a resultant voltage directly representing the information value in analogue form.

14. In combination for converting into an analogue representation an information value indicated in digital form, a plurality of bistable members having first and second stages of operation, means for introducing to the bistable members a plurality of signal indications representing the information value in digital form to trigger the bistable members into patterns of operation corresponding to the patterns of the signals, a first plurality of resistances paired electrically, each pair of resistances being connected in series with a different bistable member and to the common terminal between the resistances in the preceding pair, the resistances in the pairs being in series with the first stages of particular bistable members in the plurality and with the second stages of the other bistable members in the plurality, each of the resistances having a value dependent upon the associated bistable member to provide a weighted effect in accordance with the weight provided by the associated bistable member with respect to the information value, a second plurality of resistances paired electrically, each pair of resistances in the second plurality being connected in series with a different bistable member and to the common terminal between the resistances in the preceding pair in the plurality, the resistances in the pairs in the second pluralities being in series with the second stages of the particular bistable members and with the first stages of the other bistable members, each of the resistances in the second plurality having a value dependent upon the associated bistable member to provide a weighted effect in accordance with the weight provided by the associated bistable member with respect to the information value, and means for obtaining a first output voltage at the common terminal between the last pair of resistances in the first plurality and a second output voltage at the common terminal between the last pair of resistances in the second plurality and for obtaining the difference between the first and second output voltages to provide a resultant voltage representing the information value in analogue form.

15. In combination for converting into an analogue representation an information value indicated in digital form, a plurality of bistable members having first and second stages of operation, a voltage source having first and second terminals for providing first and second output voltages, a first plurality of resistances connected in a series circuit with the first terminal of the voltage source, the resistances in the first plurality having a particular relationship of decreasing values with respect to one another, a second plurality of resistances connected in a series circuit with the second terminal of the voltage source, the resistances in the second plurality having values corresponding o the resistances in the first plurality, a third plurality of resistances each connected between the first stages of particular bistable members in the plurality and the terminals common to different pairs of resistances in the first plurality and between the second stages of the other bistable members in the plurality and the terminals common to the other pairs of resistances in the first plurality, the resistances in the third plurality having particular values relative to one another and to the values of the resistances in the first plurality, a fourth plurality of resistances each connected between the second stages of the particular bistable members in the plurality and the terminals common to different pairs of resistances in the second plurality and between the first stages of the other bistable members in the plurality and the terminals common to the other pairs of resistances in the second plurality, the resistances in the fourth plurality having values corresponding to the resistances in the third plurality, means for introducing to the bistable members a plurality of signals representing the information value in digital form to trigger the bistable members into corresponding states of operation in which each successive bistable member indicates the value of a digit of increasing significance, means for obtaining the output voltages across the parallel branch formed by one of the resistances in the third plurality and the first stage of the bistable member of greatest digital significance and the parallel branch formed by one of the resistances in the fourth plurality and the second stage of the bistable member of greatest digital significance to obtain a voltage difference representing the information value in digital form.

16. In combination for converting into an analogue representation an information value indicated in digital form, a plurality of bistable members having first and second stages of operation, a voltage source having first and second terminals for providing first and second voltages, means for introducing to the bistable members a plurality of signals representing an information value in digital form to trigger the bistable members into a corresponding pattern of operation, a first plurality of resistances connected in circuits with the voltage source and in parallel branches with the first stages of particular bistable members in the plurality and with the second stages of the other bistable members in the plurality, each of the resistances in the first plurality having a value dependent upon its electrical disposition in the circuit formed by the resistances and the bistable members to provide a weighted effect to the operation of the different bistable members in accordance with the different digits represented by these bistable members, a second plurality of resistances connected in circuits with the voltage source and in parallel branches with the second stages of the particular bistable members in the plurality and with the first stages of the other bistable members in the plurality, each of the resistances in the second plurality having a value dependent upon its electrical disposition in the circuit formed by the resistances and the bistable members to provide a weighted effect to the operation of the different bistable members in accordance with the different digits represented by the bistable members, and means for obtaining a first output voltage from the circuitry formed by the first plurality of resistances and the bistable members and a second output voltage from the circuitry formed by the second plurality of resistances and the bistable members and for obtaining the difference between the first and second output voltages to provide a resultant voltage representing the information value in analogue form.

17. In combination, a bridge formed from a plurality of unidirectional members, a capacitance, signal means for introducing to the bridge a voltage for charging the capacitance to an energy level corresponding to the voltage, and means for introducing to the bridge a first voltage for periodically providing for a transfer of energy between the signal means and the capacitance at particular times to make the energy level in the capacitance correspond to the voltage level in the signal means and for periodically preventing a transfer of energy between the signal means and the capacitance at the other times.

18. In combination, a bridge formed from a plurality of unidirectional members, a capacitance connected to the bridge to become charged in accordance with the flow of current through the bridge, signal means for introducing voltages to the bridge for transfers of energy between the signal means and the capacitance through the bridge to charge the capacitance to values corresponding to the voltages from the signal means, a bistable member having first and second states of operation and having a first output terminal for providing a high voltage in the first state of operation and a low voltage in the second state of operation and having a second output terminal for providing a low voltage in the first state of operation and a high voltage in the second state of operation, and means including a pair of unidirectional members for introducing the voltages on the first and second output terminals of the bistable member to the bridge to provide in the first state of operation of the bistable member for adjustments in the charges in the capacitance in accordance with the voltage from the signal means and to prevent any change in the charges in the capacitance in the second state of operation of the bistable member.

19. In combination, a bridge formed from a plurality of unidirectional members and having first, second, third and fourth terminals, signal means for introducing to a first terminal in the network a voltage having a variable amplitude, a capacitance connected to the second terminal of the network to receive a charge in accordance with the voltage from the signal means, a bistable member having first and second states of operation and having first and second output terminals for producing first and second output potentials on an alternate basis dependent upon the particular state of operation, means including a pair of supplementary unidirectional members for respectively introducing the potentials on the first and second output terminals of the bistable member through the supplementary unidirectional members to the diode network in the first state of operation of the bistable member to produce the first and second output potentials on the third and fourth terminals of the diode bridge for the prevention of a variation of charge in the capacitance and for respectively introducing the potentials on the first and second output terminals of the bistable member to the supplementary unidirectional members in the second state of operation of the bistable member to provide for an adjustment in the charge in the capacitance in accordance with the voltage from the signal means.

20. In combination, first and second bridges each formed from a plurality of unidirectional members, a pair of capacitances connected to indicate an output voltage in accordance with the differences in the charges in the capacitances, signal means for providing a pair of voltages representing an information value by the difference in amplitudes, and bistable means for introducing at particular times first and second potentials to first and second terminals in the first and second bridges to provide for an adjustment of the charges in the capacitances in accordance with the amplitudes of the voltages from the signal means and for introducing at the other times the second and first potentials to the first and second terminals in the first and second bridges to prevent any adjustment in the charges in the capacitances.

21. In combination, first and second bridges formed from first and second pluralities of unidirectional members, first and second capacitances connected to represent an output value in accordance with the differences in the charges in the capacitances, signal means for respectively introducing first and second voltages to the first and second bridges for a transfer of energy between the signal means and the capacitances through the bridges to charge the capacitances to voltages corresponding to the voltages from the signal means, a bistable member having first and second states of operation and having a first output terminal for providing a high voltage in the first state of operation and a low voltage in the second state of operation and having a second output terminal for providing a low voltage in the first state of operation and a high voltage in the second state of operation, and means including first and second pairs of supplementary unidirectional members, each pair of supplementary unidirectional members being connected to the bistable member and to a different one of the bridges for introducing the voltages on the first and second output terminals of the bistable member in the first state of operation of the bistable member through the supplementary unidirectional members to the first and second bridges to prevent any adjustment in the charges in the capacitances during the first state of operation of the bistable member and for preventing the introduction to the bridges of the voltages on the first and second output terminals of the bistable member in the second state of operation of the member to obtain an adjustment of the charges in the capacitances in accordance with the voltages from the signal means.

22. In combination, a pair of bridges each formed from a plurality of unidirectional members and having first, second, third and fourth terminals common to different unidirectional members in the plurality, means for introducing between the first terminals in the bridges a voltage difference having an amplitude representative of different information, a bistable member having first and second output terminals and operative in one state to produce a high voltage on the first output terminal and a low voltage on the second output terminal and in the other state to produce a high voltage on the second output terminal and a low voltage on the first output terminal, a pair of capacitances connected to the second terminals in the bridges to become charged in accordance with the voltage difference from the voltage means, and means for introducing the voltages on the first and second output terminals in the bistable member to the third and fourth terminals in each of the diode bridges to prevent any transfer of energy between the capacitances and the diode bridges upon the operation of the bistable member in its first state and to provide for a proper adjustment of the charges in the capacitance upon the operation of the bistable member in its second state.

23. In combination, means for providing a plurality of signals representing an information value in digital form and for sequentially presenting the signal indications for use, a plurality of bistable members, means including a plurality of logical networks for presenting to the bistable members the signal indications representing the digits of least significance to trigger the bistable members into a pattern of operation corresponding to the pattern of the signals, means including a plurality of logical networks for comparing the signals representing successive pairs of digits in the sequence after the digits of least significance to produce a control signal upon the presentation of a pair of successive signals having a particular pattern and representing the information values, and means for using the control signal to convert the pattern of operation of the bistable members into a pattern of operation representing a particular value upon the introduction to the bistable members of the signals in the sequence.

24. In combination, means for providing a plurality of signals representing an information value in digital form and for sequentially presenting the signals for use, a plurality of bistable members having first and second states of operation, means including a plurality of logical networks for presenting to the bistable members the signals representing the digits of least significance to trigger the bistable members into a pattern of operation corresponding to the pattern of the signals, means for comparing the signals representing successive pairs of digits after the digits of least significance to provide a first control signal upon the occurrence of a first particular pattern in a pair of successive digits representing an information value of a first polarity and of a magnitude greater than a first particular value and to provide a second control signal upon the occurrence of a second particular pattern in a pair of successive digits representing an information value of an opposite polarity and of a magnitude greater than a second particular value, and means for using the first control signal to trigger the bistable members in the plurality into a pattern of operation representing the first particular value and of the first polarity and for using the second control signal to trigger the bistable members in the plurality into a pattern of operation representing the second particular value of the second polarity upon the presentation to the bistable members of the signals in the sequence.

25. In a combination as set forth in claim 23, means associated with the bistable members for producing an output voltage representing in analogue form the pattern of operation of the bistable members after the introduction of the sequence of signals.

26. In a combination as set forth in claim 24, means including a first plurality of resistances associated with the first states of operation of particular bistable members in the plurality and associated with the second state of operation of the other bistable members for providing a first output voltage dependent upon the pattern of operation of the bistable members, means including a second plurality of resistances associated with the second states of operation of the particular bistable members and associated with the first states of operation of the other bistable members for providing a second output voltage dependent upon the pattern of operation of the bistable members, and means for obtaining the difference between the first and second output voltages to provide a resultant voltage representing the pattern of operation of the bistable members in analogue form.

27. In combination, means for providing in a plurality of positions signal indications digitally representing an information value, a plurality of bistable members associated with the signal-indicating means for triggering in a pattern dependent upon the pattern of the signal indications, a balanced weighting network including the bistable members and a plurality of impedances and a pair of output terminals for converting the signal indications provided by the bistable members into a corresponding voltage difference between the output terminals, a load, and a balanced storage circuit including a pair of diode bridges and a pair of capacitances for storing in the capacitnces during sampling intervals a difference in charge corresponding to the difference in voltage at the output terminals and for preventing any discharge of the capacitances through the diode bridges between desampling intervals.

28. In combination, means for providing in a plurality of positions signal indications digitally representing an information value, a plurality of bistable members associated with the signal-indicating means for triggering in a pattern dependent upon the pattern of the signal indications, a balanced weighting network including the bistable members and a plurality of impedances and a pair of output terminals, each impedance having a value dependent upon its disposition in the weighting network to weight the effect of each bistable member in producing across the output terminals a difference in voltage corresponding to the information provided by the bistable members, a balanced storage circuit including a pair of diode bridges and a pair of reactance members for storing in the reactance members a difference in energy corresponding to the difference in voltage at the output terminals, and means associated with the storage circuit for providing for a transfer of energy between the diode bridges and the capacitances at particular times in accordance with the changes in the voltage difference from the balanced weighting network and for preventing any transfer of energy between the diode bridges and the capacitances at the other times.

References Cited in the file of this patent

UNITED STATES PATENTS

| | | |
|---|---|---|
| 2,426,178 | Chambers | Aug. 26, 1947 |
| 2,538,615 | Carbrey | Jan. 16, 1951 |
| 2,570,221 | Earp et al. | Oct. 9, 1951 |
| 2,614,237 | Goertz | Oct. 14, 1952 |

OTHER REFERENCES

Publ. I, Fourth Inerin Progress Report, Princeton Institute of Advanced Study, 1949-235-61 dac, pages II-16, 17, 17a.